United States Patent
Iwase et al.

(10) Patent No.: US 11,250,704 B2
(45) Date of Patent: Feb. 15, 2022

(54) INFORMATION PROVISION DEVICE, TERMINAL DEVICE, INFORMATION PROVISION SYSTEM, AND INFORMATION PROVISION METHOD

(71) Applicant: YAMAHA CORPORATION, Hamamatsu (JP)

(72) Inventors: Hiroyuki Iwase, Tokyo (JP); Yuki Seto, Tokyo (JP); Masashi Gompei, Hamamatsu (JP); Shota Moriguchi, Tokyo (JP); Takahiro Iwata, Tokyo (JP)

(73) Assignee: YAMAHA CORPORATION, Hamamatsu (JP)

( * ) Notice: Subject to any disclaimer, the term of this patent is extended or adjusted under 35 U.S.C. 154(b) by 727 days.

(21) Appl. No.: 15/684,123

(22) Filed: Aug. 23, 2017

(65) Prior Publication Data
US 2017/0352269 A1    Dec. 7, 2017

Related U.S. Application Data

(63) Continuation of application No. PCT/JP2016/054867, filed on Feb. 19, 2016.

(30) Foreign Application Priority Data

Feb. 25, 2015 (JP) .............................. JP2015-035154
Jul. 7, 2015 (JP) .............................. JP2015-136320

(51) Int. Cl.
*G08G 1/123* (2006.01)
*B61L 25/02* (2006.01)
(Continued)

(52) U.S. Cl.
CPC ............ *G08G 1/123* (2013.01); *B61L 15/009* (2013.01); *B61L 15/0027* (2013.01);
(Continued)

(58) Field of Classification Search
None
See application file for complete search history.

(56) References Cited

U.S. PATENT DOCUMENTS 6,850,766 B2   2/2005   Lau et al.
2002/0168986 A1*  11/2002   Lau .................... G01C 21/3608
455/456.1
(Continued)

FOREIGN PATENT DOCUMENTS

CN   105793907 A   7/2016
JP   H02190888 A   7/1990
(Continued)

OTHER PUBLICATIONS

International Search Report issued in Intl. Appln. PCT/JP2016/054867 dated May 24, 2016. English translation provided.
(Continued)

*Primary Examiner* — Donald J Wallace
(74) *Attorney, Agent, or Firm* — Rossi, Kimms & McDowell LLP

(57) ABSTRACT

An information provision device transmits, by near field communication, fixed phrase information, of guidance information that guides a user, representative of a fixed phrase and insertion phrase information selected from among a plurality of pieces of insertion phrase information representative of different insertion phrases to be inserted in the fixed phrase, to a terminal device capable of presenting, to the user, presentation information corresponding to the guidance information where the insertion phrase represented by the insertion phrase information is inserted in the fixed phrase represented by the fixed phrase information.

10 Claims, 14 Drawing Sheets

(51) Int. Cl.
  *G08G 1/005* (2006.01)
  *B61L 27/00* (2022.01)
  *G08G 1/133* (2006.01)
  *B61L 15/00* (2006.01)
  *G01C 21/36* (2006.01)
  *G01C 21/26* (2006.01)

(52) U.S. Cl.
  CPC ........... *B61L 15/0072* (2013.01); *B61L 25/02* (2013.01); *B61L 27/0022* (2013.01); *G01C 21/26* (2013.01); *G01C 21/3629* (2013.01); *G08G 1/005* (2013.01); *G08G 1/133* (2013.01)

(56) References Cited

U.S. PATENT DOCUMENTS

| | | | |
|---|---|---|---|
| 2010/0217515 | A1 | 8/2010 | Arai |
| 2012/0214416 | A1* | 8/2012 | Kent ........................ H04W 4/21 455/41.2 |

FOREIGN PATENT DOCUMENTS

| | | |
|---|---|---|
| JP | H08228370 A | 9/1996 |
| JP | 2000235697 A | 8/2000 |
| JP | 2003214882 A | 7/2003 |
| JP | 2005145163 A | 6/2005 |
| JP | 2007158789 A | 6/2007 |
| JP | 2008155765 A | 7/2008 |
| JP | 2009205485 A | 9/2009 |
| JP | 2009219510 A | 10/2009 |
| JP | 2009237989 A | 10/2009 |
| JP | 2010197158 A | 9/2010 |
| JP | 2013200699 A | 10/2013 |
| JP | 2014075067 A | 4/2014 |
| KR | 101398065 B1 | 5/2014 |
| WO | 2011057797 A1 | 5/2011 |

OTHER PUBLICATIONS

Written Opinion issued in Intl. Appln. PCT/JP2016/054867 dated May 24, 2016.
English translation of Written Opinion issued in Intl. Appln. PCT/JP2016/054867 dated May 24, 2016, cited in IDS filed on Aug. 23, 2017.
Office Action issued in Japanese Appln. No. 2015-136320 dated Jul. 23, 2019. English translation provided.
Extended European Search Report issued in European Appln. No. 16755365.0 dated Oct. 11, 2018.
Office Action issued in Chinese Application No. 201680012246.8 dated Nov. 4, 2020. English translation provided.
Office Action issued in Chinese Appln. No. 201680012246.8 dated Oct. 9, 2019. English translation provided.

* cited by examiner

| ID | FIXED PHRASE |
|---|---|
| 101 | THE NEXT STATION IS XX. THE DOORS ON THE YY SIDE WILL OPEN. |
| 102 | PLEASE CHANGE AT THE NEXT STATION FOR THE XX LINE, WHICH IS BOARDED FROM PLATFORM YY. |
| 103 | THE TRAIN FOR YY WILL SOON ARRIVE AT THE XX LINE. |
| 104 | THIS TRAIN HAS STOPPED AT A STOP SIGNAL, AND WILL START AS SOON AS THE TRAIN AT XX STATION LEAVES. |
| ⋮ | ⋮ |

| ID | INSERTION PHRASE |
|---|---|
| 201 | SHIBUYA |
| 202 | SHINJUKU |
| 203 | MARUNOUCHI |
| 204 | YAMANOTE |
| 205 | 1ST |
| 206 | 2ND |
| ⋮ | ⋮ |

DB

TB2-2

| ID | INSERTION PHRASE |
|---|---|
| 301 | RIGHT |
| 302 | LEFT |
| 303 | 1ST |
| 304 | 2ND |
| 305 | SHIBUYA, SHINJUKU |
| 306 | SHINAGAWA, TOKYO |
| ⋮ | ⋮ |

| DB1 | TB2-1 |
|---|---|
| ID | INSERTION PHRASE |
| 000000 | 0 |
| 000001 | 1 |
| 000010 | 2 |
| ⋮ | ⋮ |
| 010110 | 22 |
| 010111 | 23 |

| DB2 | TB2-2 |
|---|---|
| ID | INSERTION PHRASE |
| 000000 | 0 |
| 000001 | 1 |
| 000010 | 2 |
| 000011 | 3 |
| ⋮ | ⋮ |
| 111011 | 59 |

| DB3 | TB2-3 |
|---|---|
| ID | INSERTION PHRASE |
| 0000 | SHINJUKU |
| 0001 | YOYOGI |
| 0010 | HARAJUKU |
| 0011 | SHIBUYA |
| 0100 | EBISU |
| 0101 | MEGURO |
| ⋮ | ⋮ |

INFORMATION PROVISION DEVICE, TERMINAL DEVICE, INFORMATION PROVISION SYSTEM, AND INFORMATION PROVISION METHOD

CROSS REFERENCE TO RELATED APPLICATION(S)

This application is a continuation of International Patent Application No. PCT/JP2016/054867 filed on Feb. 19, 2016 which claims the priorities of Japanese Patent Application No. 2015-35154 filed on Feb. 25, 2015 and Japanese Patent Application No. 2015-136320 filed on Jul. 7, 2015, the contents of which are incorporated herein by reference in its entirety.

BACKGROUND OF THE INVENTION

1. Field of the Invention

The present invention relates to a technology to provide a user with information.

2. Description of the Related Art

Various technologies to guide users at transportation sites such as trains and buses and at exhibition facilities such as art museums and museums have conventionally been proposed. For example, JP-A-2-190888 as Patent Document 1 discloses an individual guidance system that reproduces, of a plurality of explanatory voices prestored in a guidance-specific reproduction unit carried by a user, the explanatory voice corresponding to the code information transmitted from the transmission means in the vicinity of each exhibit.

Patent Document 1: JP-A-2-190888

SUMMARY OF THE INVENTION

For example, at transportation sites such as trains and buses, guidance voices to provide users with information related to getting on and off, transfer and the like are broadcast. If guidance information such as character strings and translated sentences of vocal contents of guidance voices can be provided to users' mobile terminals, it is convenient because even users such as hard-of-hearing persons for whom it is difficult to hear guidance voices and foreigners for whom it is difficult to understand the language of the guidance voices can grasp the guidance. However, a configuration in which guidance information is individually prepared for each content of the guidance (for example, a configuration in which for each point where the train or the bus stops, guidance information to notify the arrival at the point is prepared) has a problem in that the amount of data of the guidance information necessary for providing users with various pieces of guidance is large.

In view of the above-mentioned circumstances, a non-limited object of the present invention is to reduce the amount of data necessary for guiding the user.

There is provided an information provision device including: a processing unit; and a memory storing instructions, the processing unit executing the stored instructions to: transmit, by near field communication, fixed phrase information, of guidance information that guides a user, representative of a fixed phrase and insertion phrase information, of the guidance information, selected from among a plurality of pieces of insertion phrase information representative of different insertion phrases to be inserted in the fixed phrase, to a terminal device capable of presenting, to the user, presentation information corresponding to the guidance information where the insertion phrase represented by the insertion phrase information is inserted in the fixed phrase represented by the fixed phrase information along with emission of a guidance voice which is an utterance of the guidance information.

There is also provided a terminal device including: a processing unit; and a memory storing instructions, the processing unit executing the stored instructions to: receive fixed phrase information, of guidance information that guides a user, representative of a fixed phrase and insertion phrase information, of the guidance information, selected from among a plurality of pieces of insertion phrase information representative of different insertion phrases to be inserted in the fixed phrase, from an information provision device that transmits the fixed phrase information and the insertion phrase information by near field communication; generate presentation information corresponding to the guidance information where the insertion phrase represented by the received insertion phrase information is inserted in the fixed phrase represented by the received fixed phrase information; and present, to the user, the generated presentation information generated along with emission of a guidance voice which is an utterance of the guidance information.

BRIEF DESCRIPTION OF THE DRAWINGS

FIG. 5 is a view showing an example of the data structure of a fixed phrase information table TB1 of the first embodiment.

FIG. 6 is a view showing an example of the data structure of an insertion phrase information table TB2 of the first embodiment.

DETAILED DESCRIPTION OF THE EXEMPLARY EMBODIMENTS

First Embodiment

Figure 1:
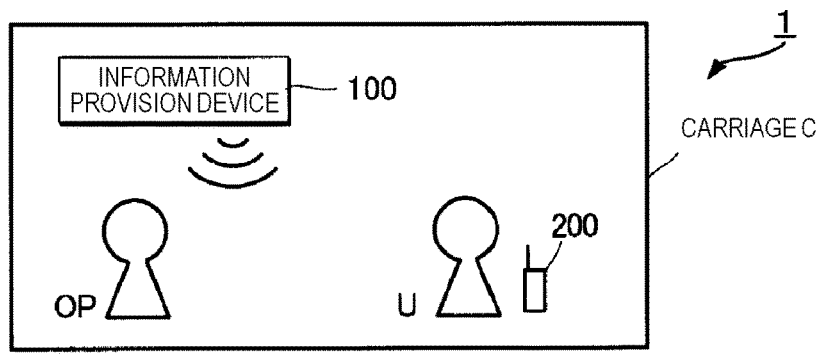
FIG. 1 is a configuration diagram of an information provision system 1 according to a first embodiment.

FIG. 1 is a configuration diagram of an information provision system 1 according to a first embodiment of the present invention. The information provision system 1 of the first embodiment is a computer system that provides information to users U of transportation sites such as trains and buses, and is provided with an information provision device 100 and a terminal device 200. The information provision device 100 is placed in a carriage C of the transportation sites, and emits voices for guidance (hereinafter, referred to as "guidance voices") related to the transportation sites, to the user U in the carriage C. The guidance voices are voices providing guidance, for example, on getting on and off of the transportation sites (the names of stops such as train stations and bus stops), getting-on (getting-off) positions, transfer, fares, operation situations (for example, a stop signal, an operation interval, a delay state) and surrounding tourist attractions. While more than one mobile terminal device 200 can exist in the carriage C in actuality, the following description will focus on one given terminal device 200 for the sake of convenience.

The terminal device 200 is a portable communication terminal (for example, a mobile telephone or a smartphone) carried by the user U situated in the carriage C, collects the guidance voice emitted by the information provision device 100, and presents to the user U the guidance information represented by the guidance voice. The guidance information is information that guides the user U of the transportation sites. For example, a character string representing a guidance voice (for example, a character string for a hard-of-hearing person to visually confirm the guidance), or a voice or a character string which is a translation of the guidance by the guidance voice to another language is provided to the terminal device 200 as guidance information and reproduced (emitted or displayed). Details of elements of the information provision system 1 will be described below.

<Information Provision Device 100>

Figure 2:
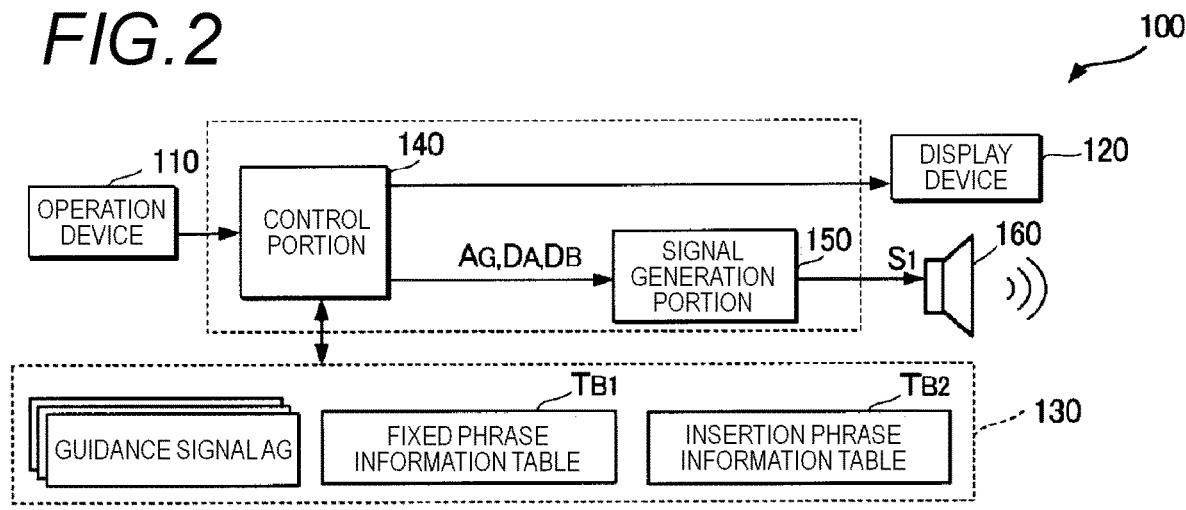
FIG. 2 is a block diagram showing the structure of an information provision device 100 of the first embodiment.

FIG. 2 is a block diagram showing the structure of the information provision device 100. As shown by example in FIG. 1, the information provision device 100 includes a display device 120, an operation device 110, a control portion 140, a storage portion 130, a signal generation portion 150 (the signal generation means) and a sound emission device 160 (the transmission means). The display device 120 (for example, a liquid crystal panel) displays character strings, images and the like in response to an instruction from the control portion 140. The operation device 110 is an input device that accepts an operation by an operator (for example, the driver of the carriage C) OP of the transportation sites, and is, for example, a touch panel superimposed on the display device 120. The operator OP appropriately operates the operation device 110 to thereby select a given piece of guidance information from among a plurality of pieces of guidance information.

Figure 3:
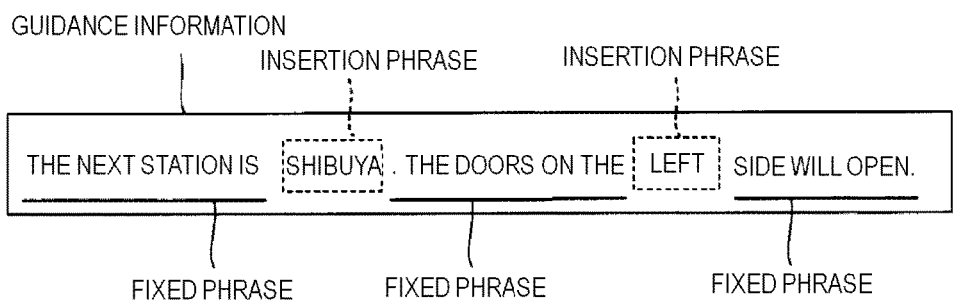
FIG. 3 is an explanatory view of guidance information.

FIG. 3 is an explanatory view of the guidance information. The guidance information contains, as shown by example in FIG. 3, a fixed phrase and insertion phrases. The fixed phrase is a fixed character string (for example, words and phrases) commonly used among a plurality of pieces of guidance information. The insertion phrases are character strings (for example, words and phrases) to be inserted in the fixed phrase, and are, for example, proper nouns such as station names and line names and numerals representative of the number of the getting-on (getting-off) platform. In one fixed phrase, an insertion phrase selected from among a plurality of different insertion phrases is inserted. For example, when guidance information "The next station is Shibuya. The doors on the left side will open." shown by example in FIG. 3 and guidance information "The next station is Ebisu. The doors on the right side will open." providing information on a different station are assumed, the character string "The next station is XX. The doors on the YY side will open." corresponds to the fixed phrase, and the character strings "Shibuya", "Ebisu", "left" and "right" inserted in the blank fields of the fixed phrase correspond to insertion phrases. The operator OP selects one fixed phrase from among a plurality of different fixed phrases and selects insertion phrases to be inserted in the fixed phrase from among a plurality of different insertion phrases, thereby selecting one piece of guidance information. In the following description, the blank fields of the fixed phrases in which insertion phrases are to be inserted (in the example of FIG. 3, the blank fields indicated by the dotted frames) will be referred to as "insertion section TS".

Figure 4:
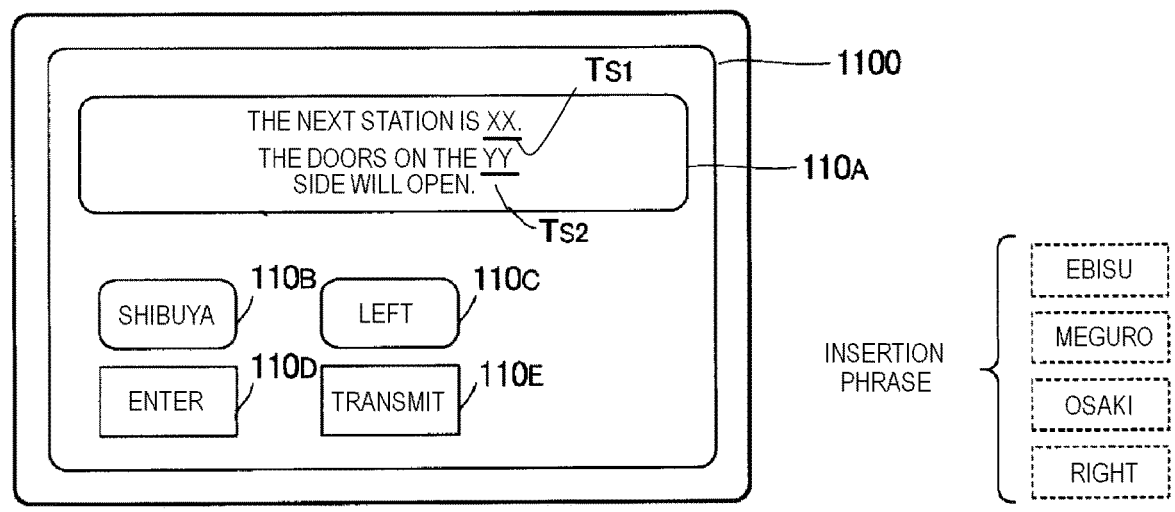
FIG. 4 is an explanatory view of selection of the guidance information.

FIG. 4 is an explanatory view related to guidance information selection. For example, by the operator OP appropriately operating the operation device 110, a guidance information selection screen 1100 shown by example in FIG. 4 is displayed on the display device 120. The guidance information selection screen 1100 is a screen that accepts the guidance information selection by the operator OP, and as shown by example in FIG. 4, includes a fixed phrase selection field 110A, insertion phrase selection fields 110B and 110C, an enter button 110D and a transmission button 110E. The fixed phrase selection field 110A displays a plurality of fixed phrases in a pull-down format in response to the operation by the operator OP, and accepts the selection of one fixed phrase by the operator OP. The insertion phrase selection fields 110B and 110C display a plurality of insertion phrases in a pull-down format in response to the operation by the operator OP, and accepts the selection of one insertion phrase from among the plurality of insertion phrases. The enter button 110D accepts an instruction to confirm the selected fixed phrase and insertion phrase as the objects of transmission. The transmission button 110E accepts an instruction to transmit the fixed phrase and the insertion phrase confirmed as the objects of transmission.

The operator OP operates the fixed phrase selection field 110A of the guidance information selection screen 1100 to thereby select one fixed phrase from among the plurality of different fixed phrases, and operates the insertion phrase selection fields 110B and 110C to thereby select one or more insertion phrases to be inserted in the selected fixed phrase. Presentation information G corresponding to the guidance information created by inserting the selected insertion phrase into the selected fixed phrase is presented to the user U of the terminal device 200. When the operator OP operates the enter button 110D under a condition where a fixed phrase and an insertion phrase are selected on the guidance information selection screen 1100 shown by example in FIG. 4, the fixed phrase and the insertion phrase are confirmed as the objects of transmission.

FIG. 4 shows by example the guidance information selection screen 1100 when a fixed phrase "The next station is XX. The doors on the YY side will open." and insertion phrases "Shibuya" and "left" are selected by the operator OP. As is grasped from FIG. 4, guidance information "The next station is Shibuya. The doors on the left side will open." where the insertion phrase "Shibuya" is inserted in an insertion section TS1 of the fixed phrase and the insertion phrase "left" is inserted in an insertion section TS2 thereof is presented to the user U of the terminal device 200. As shown by example in FIG. 4, in the first embodiment, one fixed phrase can include a plurality of insertion sections TS. Moreover, in the insertion sections TS (TS1, TS2) of the fixed phrase, a plurality of different insertion phrases can be inserted. For example, as shown by example in FIG. 4, in the insertion section TS1, any of the insertion phrases other than the insertion phrase "Shibuya" (for example, "Ebisu", "Meguro", "Osaki") may be inserted. Moreover, in the insertion section TS2, the insertion phrase "right" other than the insertion phrase "left" may be inserted. As is grasped from the above description, one fixed phrase is shared for the provision of a plurality of pieces of guidance information containing different insertion phrases.

The storage portion 130 of FIG. 2 is formed of, for example, a known recording medium such as a semiconductor recording medium or a magnetic recording medium, and stores a plurality of sound signals (hereinafter, referred to as "guidance signals") AG (AG1, AG2, . . . ) representative of different guidance voices, a fixed phrase information table TB1 and an insertion phrase information table TB2.

FIG. 5 is a view showing an example of the data structure of the fixed phrase information table TB1. The fixed phrase information table TB1 associates each of a plurality of fixed phrases and each of a plurality of pieces of fixed phrase information DA with each other. The fixed phrase information DA is identification information (101, 102, 103, . . . ) for uniquely identifying each of the plurality of fixed phrases.

FIG. 6 is a view showing an example of the data structure of the insertion phrase information table TB2. The insertion phrase information table TB2 (TB2-1, TB2-2) associates each of a plurality of insertion phrases and each of a plurality of pieces of insertion phrase information DB with each other. The insertion phrase information DB is identification information (201, 202, 203, . . . ) for uniquely identifying each of the plurality of insertion phrases. The insertion phrase information table TB2-1 of FIG. 6 includes insertion phrases to be inserted in the first insertion section TS1 of the fixed phrase, and the insertion phrase information table TB2-2 includes insertion phrases to be inserted in the second insertion section TS2 of the fixed phrase.

The control portion 140 of FIG. 2 reads from the storage portion 130 the guidance signal AG of the guidance information selected by the operator OP, reads from the storage portion 130 the fixed phrase information DA corresponding to the fixed phrase of the guidance information among the plurality of fixed phrases in the fixed phrase information table TB1 and the insertion phrase information DB corresponding to the insertion phrase of the guidance information among the plurality of insertion phrases in the insertion phrase information table TB2, and supplies the signal generation portion 150 with the guidance signal AG, the fixed phrase information DA and the insertion phrase information DB. In the example of FIG. 4, the control portion 140 reads fixed phrase information DA(101) representative of the fixed phrase "The next station is XX. The doors on the YY side will open" from the fixed phrase information table TB1, insertion phrase information DB(201) representative of the insertion phrase "Shibuya" from the insertion phrase information table TB2-1 and insertion phrase information DB(302) representative of the insertion phrase "left" from the insertion phrase information table TB2-2, and supplies them to the signal generation portion 150 together with the guidance signal AG.

The signal generation portion 150 generates a sound signal (hereinafter, referred to as "reproduction signal") S1 where the audio components representative of the fixed phrase information DA and the insertion phrase information DB read by the control portion 140 are mixed into the guidance signal AG. While a known method may be arbitrarily adopted for the superimposition of the fixed phrase information DA and the insertion phrase information DB on the guidance signal AG, for example, the method disclosed in WO 2010/016589 is suitable.

Figure 7:
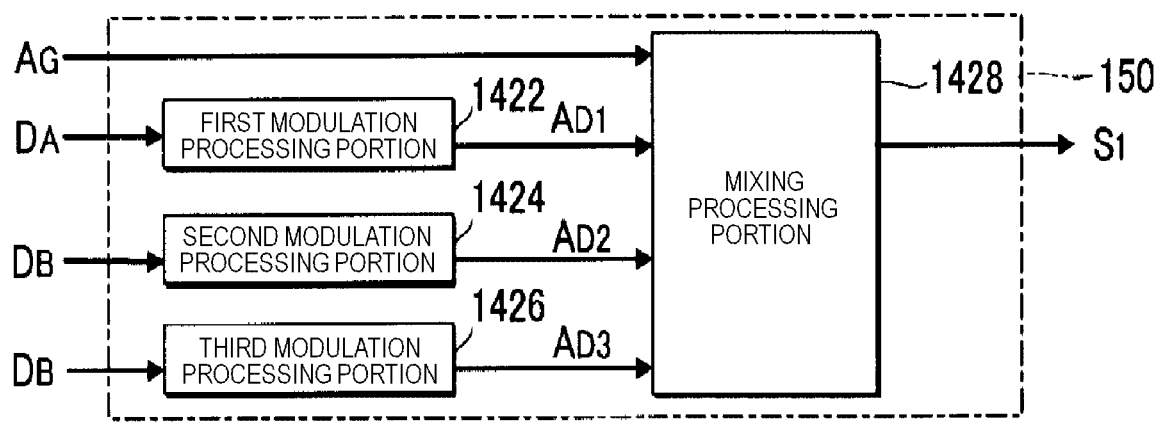
FIG. 7 is a block diagram showing the structure of a signal generation portion 150 of the first embodiment.

FIG. 7 is a block diagram showing the structure of the signal generation portion 150. As shown by example in FIG. 7, the signal generation portion 150 includes a first modulation processing portion 1422, a second modulation processing portion 1424, a third modulation processing portion 1426 and a mixing processing portion 1428. The first modulation processing portion 1422 successively executes spread modulation of the fixed phrase information DA using a spread code and frequency conversion using a carrier wave of a first frequency band B1, thereby generating a sound signal (hereinafter, referred to as "first modulation signal") AD1 containing the fixed phrase information DA as the audio component of the first frequency band B1. The second modulation processing portion 1424 generates, by a similar method to that of the first modulation processing portion 1422, a sound signal (hereinafter, referred to as "second modulation signal") AD2 containing the insertion phrase information DB read from the insertion phrase information table TB2-1 as the audio component of a second frequency band B2. The third modulation processing portion 1426 generates, by a similar method to that of the first modulation processing portion 1422, a sound signal (hereinafter, referred to as "third modulation signal") AD3 containing the insertion phrase information DB read from the insertion phrase information table TB2-2 as the audio component of a third frequency band B3. The mixing processing portion 1428 mixes (typically, adds) the guidance signal AG supplied from the control portion 140, the first modulation signal AD1 generated by the first modulation processing portion 1422, the second modulation signal AD2 generated by the second modulation processing portion 1424 and the third modulation signal AD3 generated by the third modulation processing portion 1426, thereby generating the reproduction signal S1. That is, the reproduction signal S1 is a sound signal containing the audio components representative of the fixed phrase information DA and the insertion phrase information DB together with the audio component of the guidance voice.

The first frequency band B1, the second frequency band B2 and the third frequency band B3 are frequency bands where the sound emission by the sound emission device 160 and the sound collection by the terminal device 200 are possible, and set to frequency bands higher than the frequency band of the sound such as voices and musical sounds that the user U hears in a normal environment. The first frequency band B1, the second frequency band B2 and the third frequency band B3 are different from one another. Specifically, as shown by example in FIG. 8, the first frequency band B1 is set, for example, to a frequency band of not less than 20 kHz and not more than 22 kHz, the second frequency band B2 is set, for example, to a frequency band of not less than 18 kHz and not more than 20 kHz, and the third frequency band B3 is set, for example, to a frequency band of not less than 16 kHz and not more than 18 kHz.

The sound emission device 160 (for example, a speaker) emits the sound corresponding to the reproduction signal S1 generated by the signal generation portion 150 by being triggered by an operation of the transmission button 110E by the operator OP. That is, together with the guidance voice which is an utterance of the guidance information, the audio component (the first modulation signal AD1) of the fixed phrase information DA of the fixed phrase of the guidance information and the audio component (the modulation signals AD2 and AD3) of the insertion phrase information DB are emitted from the sound emission device 160. As is understood from the above description, the sound emission device 160 of the first embodiment functions as transmission means for transmitting the fixed phrase information DA and the insertion phrase information DB to the terminal device 200 by audio communication using sounds which are air vibrations as the transmission medium. As is understood from FIG. 8, the transmission of the fixed phrase information DA using the first frequency band B1, the transmission of the insertion phrase information DB using the second frequency band B2 and the transmission of the insertion phrase information DB using the third frequency band B3 are executed in parallel. While only one sound emission device 160 is shown in FIG. 1, in actuality, the sound corresponding to the reproduction signal S1 is parallelly emitted from each of a plurality of sound emission devices 160 placed in the carriage C.

<Terminal Device 200>

Figure 9:
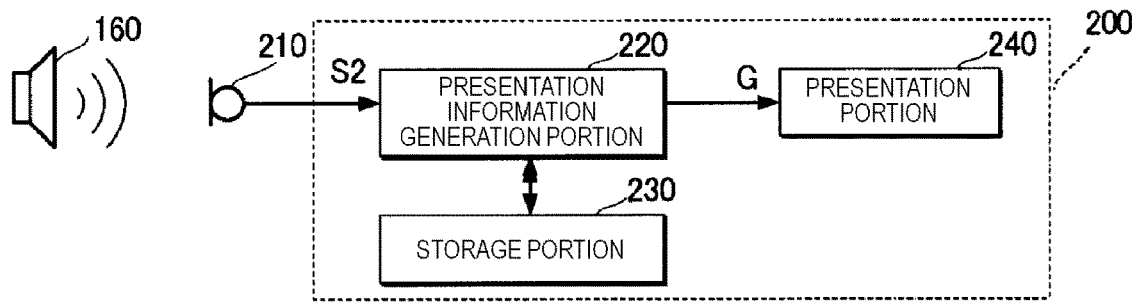
FIG. 9 is a block diagram showing the structure of a terminal device 200 of the first embodiment.

FIG. 9 is a block diagram showing the structure of the terminal device 200. As shown by example in FIG. 9, the terminal device 200 is provided with a sound collection device 210, a presentation information generation portion 220, a storage portion 230 and a presentation portion 240. The sound collection device 210 is an acoustic device (microphone) collecting surrounding sounds, collects the sound emitted from the sound emission device 160 of the information provision device 100, and generates a sound signal (hereinafter, referred to as "sound collection signal") S2 representative of the temporal waveform of the sound. The sound collection signal S2 contains the audio component of the fixed phrase information DA and the audio component of the insertion phrase information DB. The illustration of an A/D converter that analog-to-digital converts the sound collection signal S2 generated by the sound collection device 210 is omitted for the sake of convenience.

The storage portion 230 stores the fixed phrase information table TB1 and the insertion phrase information table TB2 (TB2-1, TB2-2). Detailed descriptions of the fixed phrase information table TB1 and the insertion phrase information table TB2 stored in the storage portion 230 of the terminal device 200 are omitted since they are similar to those of the fixed phrase information table TB1 and the insertion phrase information table TB2 stored in the storage portion 130 of the information provision device 100. Although not shown in FIG. 9, the storage portion 230 stores the insertion phrase information table TB2-1 storing the insertion phrases to be inserted in the insertion section TS1 of the fixed phrase and the insertion phrase information table TB2-2 storing the insertion phrases to be inserted in the insertion section TS2. The presentation information generation portion 220 generates the presentation information G corresponding to the guidance information selected by the operator OP by the demodulation of the sound collection signal S2 generated by the sound collection device 210.

Figure 10:
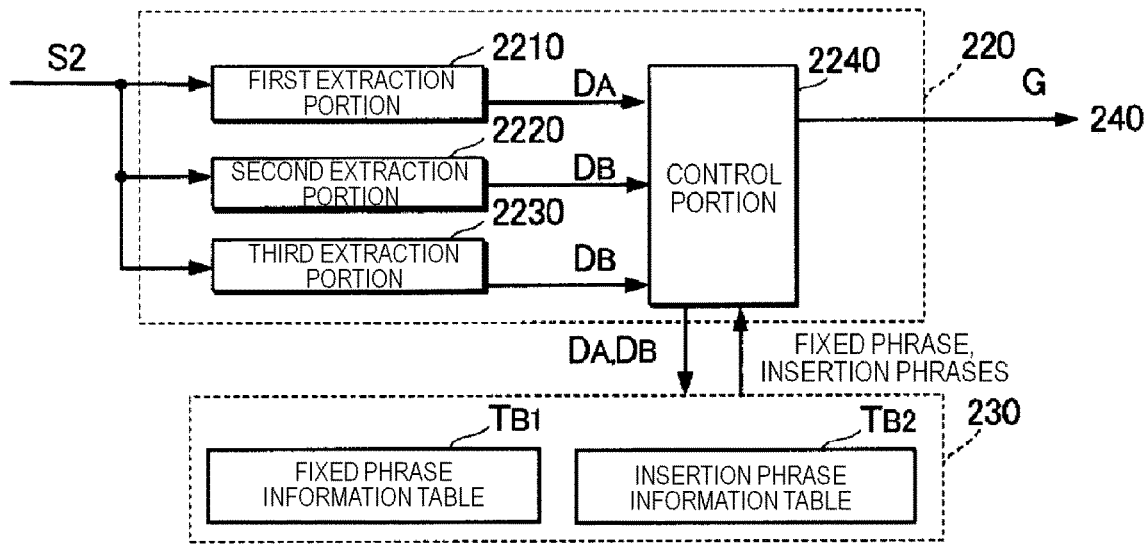
FIG. 10 is a block diagram showing the structure of a presentation information generation portion 220 of the first embodiment.

FIG. 10 is a block diagram showing the structure of the presentation information generation portion 220. As shown by example in FIG. 10, the presentation information generation portion 220 includes a first extraction portion 2210, a second extraction portion 2220, a third extraction portion 2230 and a control portion 2240. The first extraction portion 2210 enhances, of the sound collection signal S2, the band component of the first frequency band B1 containing the fixed phrase information DA by a band-pass filter and causes it to pass through a matched filter the coefficient of which is the spread code used for the spread modulation of the fixed phrase information DA, thereby extracting the fixed phrase information DA. The second extraction portion 2220 enhances, of the sound collection signal S2, the band component of the second frequency band B2 containing the insertion phrase information DB by a band-pass filter and causes it to pass through a matched filter the coefficient of which is the spread code used for the spread modulation of the insertion phrase information DB, thereby extracting the insertion phrase information DB. The third extraction portion 2230 enhances, of the sound collection signal S2, the band component of the third frequency band B3 containing the insertion phrase information DB by a band-pass filter and causes it to pass through the matched filter the coefficient of which is the spread code used for the spread modulation of the insertion phrase information DB, thereby extracting the insertion phrase information DB. The first extraction portion 2210 to the third extraction portion 2230 supply the control portion 2240 with the fixed phrase information DA and the insertion phrase information DB extracted by the above-described methods.

The control portion 2240 reads the fixed phrase corresponding to the fixed phrase information DA extracted by the first extraction portion 2210 from among a plurality of fixed phrases of the fixed phrase information table TB1, reads the insertion phrase corresponding to the insertion phrase information DB extracted by the second extraction portion 2220 from the insertion phrase information table TB2-1, and reads the insertion phrase corresponding to the insertion phrase information DB extracted by the third extraction portion 2230 from the insertion phrase information table TB2-2. That is, the fixed phrase and the insertion phrases of the guidance information selected by the operator OP are identified by the control portion 2240. The control portion 2240 generates as the presentation information G the guidance information where the insertion phrases are inserted in the insertion sections TS (TS1, TS2) of the fixed phrase read from the storage portion 230. Specifically, as shown by example in FIG. 4, the guidance information "The next station is Shibuya. The doors on the left side will open." created by inserting the insertion phrase "Shibuya" represented by the insertion phrase information DB [201] into the insertion section TS1 of the fixed phrase "The next station is XX. The doors on the YY side will open." represented by the fixed phrase information DA [101] and inserting the insertion phrase "left" represented by the insertion phrase information DB [302] into the insertion section TS2 of the fixed phrase is generated as the presentation information G. As is understood from the above description, the sound collection device 210 of the first embodiment functions as reception means for receiving from the information provision device 100 the fixed phrase information DA representative of a fixed phrase and the insertion phrase information DB representative of an insertion phrase to be inserted in the fixed phrase by audio communication.

Figure 11:
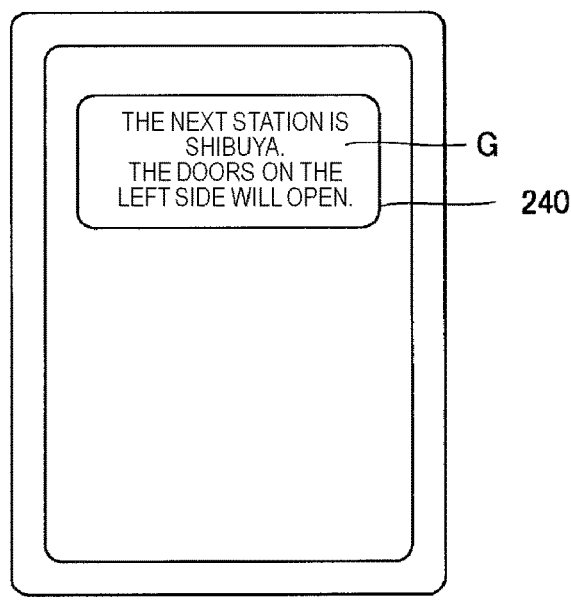
FIG. 11 is an explanatory view of presentation information G created by the presentation information generation portion 220 of the first embodiment.

The presentation portion 240 of FIG. 9 presents the presentation information G generated by the presentation information generation portion 220 to the user U. The presentation portion 240 of the first embodiment is, as shown by example in FIG. 11, a display device that displays the presentation information G. FIG. 11 shows an example in which the presentation information G "The next station is Shibuya. The doors on the left side will open." created by the presentation information generation portion 220 is presented on the presentation portion 240.

Figure 12:
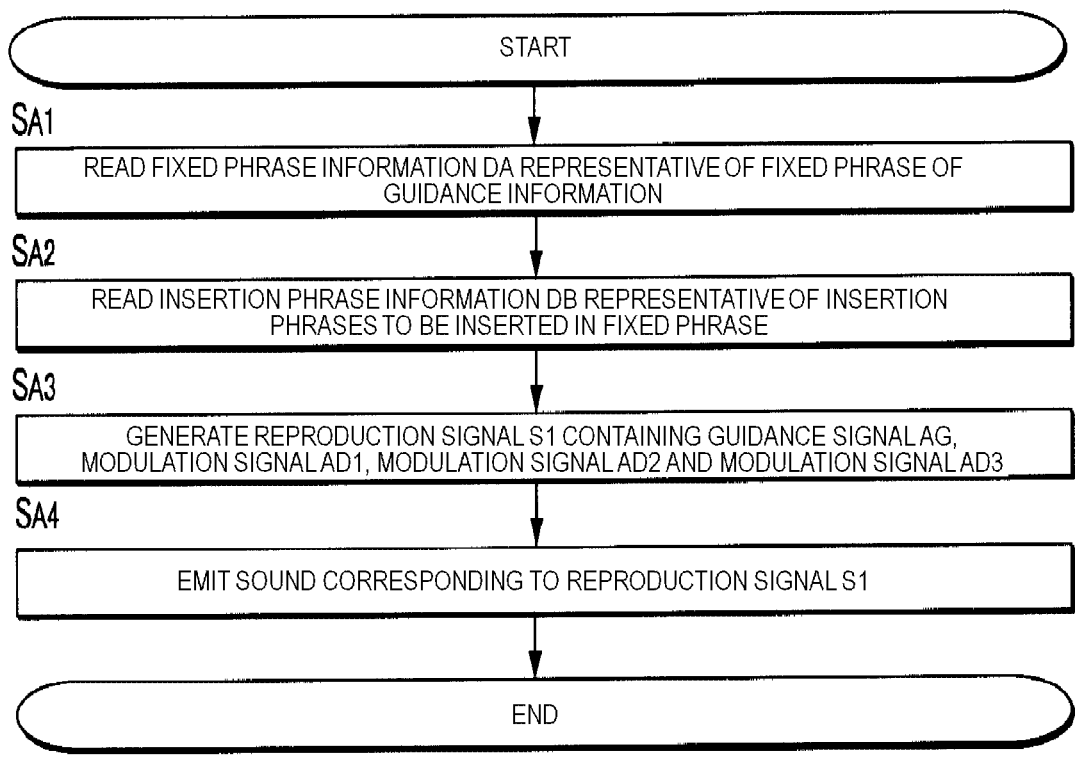
FIG. 12 is a flowchart of an operation executed by the information provision device 100 of the first embodiment.

FIG. 12 is a flowchart of a general operation of the information provision device 100 of the present embodiment. For example, when a fixed phrase and insertion phrases are selected by the operator OP, the processing of FIG. 12 is started. The control portion 140 reads from the fixed phrase information table TB1 of the storage portion 130 the fixed phrase information DA representative of one fixed phrase selected by the operator OP on the guidance information selection screen 1100 of FIG. 4 (SA1), and reads from the insertion phrase information table TB2 (TB2-1, TB2-2) of the storage portion 130 the insertion phrase information DB representative of the insertion phrases selected by the operator OP (SA2). The control portion 140 supplies the signal generation portion 150 with the fixed phrase information DA read at step SA1 and the insertion phrase information DB read at step SA2 together with the guidance signal AG. The signal generation portion 150 mixes the guidance signal AG, the first modulation signal AD1, the second modulation signal AD2 and the third modulation signal AD3 to thereby generate the reproduction signal S1 (SA3). The sound emission device 160 emits the sound corresponding to the reproduction signal S1 generated by the signal generation portion 150 in response to an instruction by the operator OP (SA4).

Figure 13:
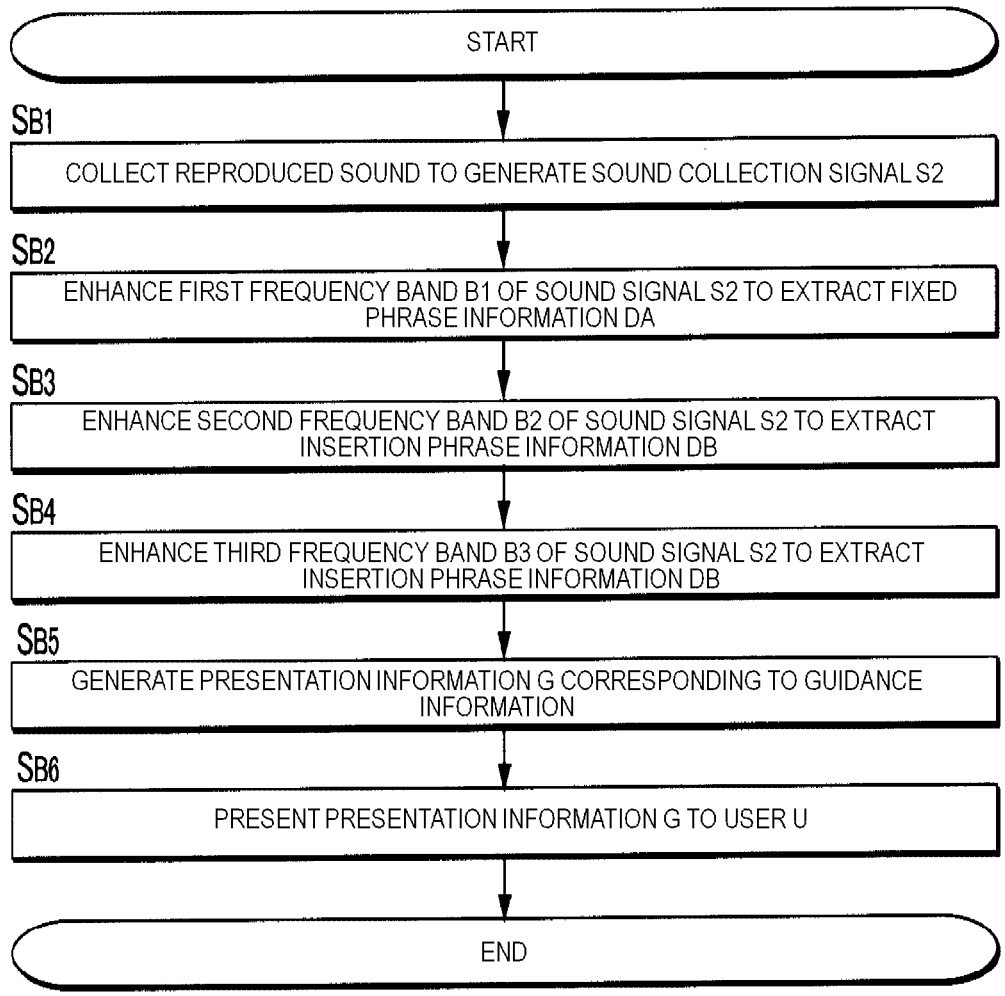
FIG. 13 is a flowchart of an operation executed by the terminal device 200 of the first embodiment.

FIG. 13 is a flowchart of a general operation of the terminal device 200 of the present embodiment. For example, the processing of FIG. 13 is started every predetermined time. The sound collection device 210 of the terminal device 200 collects the sound emitted from the sound emission device 160 of the information provision device 100 to generate the sound collection signal S2 (SB1). The first extraction portion 2210 extracts the fixed phrase information DA contained in the sound collection signal S2 as the audio component of the first frequency band B1 (SB2). The second extraction portion 2220 extracts the insertion phrase information DB contained in the sound collection signal S2 as the audio component of the second frequency band B2 (SB3). The third extraction portion 2230 extracts the insertion phrase information DB contained in the sound collection signal S2 as the audio component of the third frequency band B3 (SB4). The control portion 2240 generates as the presentation information G the guidance information formed by reading from the storage portion 230 the fixed phrase representative of the fixed phrase information DA and the insertion phrases representative of the insertion phrase information DB and combining them with each other (SB5). The presentation portion 240 presents the presentation information G generated by the presentation information generation portion 220 to the user U (SB6).

As described above, in the first embodiment, the fixed phrase information DA representative of the fixed phrase of the guidance information and the insertion phrase information DB to be inserted in the fixed phrase are transmitted from the information provision device 100 to the terminal device 200 and the insertion phrase is inserted into the fixed phrase on the side of the terminal device 200, thereby creating the presentation information G. Here, a structure is assumed in which a plurality of pieces of guidance information where words corresponding to insertion phrases are different are prepared, for example, for each stop and selectively provided to the user U (hereinafter, referred to as "comparative example"). In the comparative example, it is necessary to separately hold guidance information "The next station is Shibuya. The doors on the left side will open." and guidance information "The next station is Ebisu. The doors on the right side will open." in the information provision device 100 (the storage portion 130). On the contrary, according to the first embodiment, since one fixed phrase is shared for the provision of a plurality of pieces of guidance information containing different insertion phrases, the amount of data necessary for providing the terminal device 200 with a variety of guidance information (for example, the storage capacity necessary for the storage portion 130 of the information provision device 100) can be reduced compared with the comparative example.

Moreover, in the first embodiment, fixed phrases commonly used among a plurality of different pieces of guidance information are prepared, the fixed phrase information DA representative of one fixed phrase among the plurality of fixed phrases and the insertion phrase information DB representative of the insertion phrase corresponding to the one fixed phrase are transmitted to the terminal device 200. According to the above-described structure, a variety of guidance information where not only insertion phrases but also fixed phrases are different can be provided to the terminal device 200.

Moreover, in the first embodiment, by emitting the sound containing the guidance voice in response to the reproduction signal S1 containing the audio components of the fixed phrase information DA and the insertion phrase information DB together with the audio component of the guidance voice, the fixed phrase information DA and the insertion phrase information DB are transmitted to the terminal device 200 by audio communication. With the above-described structure, the presentation information G corresponding to the guidance information can be presented to the user U of the terminal device 200 along with the emission of the guidance voice. Moreover, with the above-described stricture, since the sound emission device 160 that emits the guidance voice is used for the transmission of both the fixed phrase information DA and the insertion phrase information DB, an advantage is obtained in that a communication device exclusively used for the transmission of the fixed phrase information DA and the insertion phrase information DB is unnecessary.

In the first embodiment, identification information (101, 102, 103, . . . ) for uniquely identifying each of the plurality of fixed phrases is transmitted as the fixed phrase information DA, and identification information (201, 202, 203, . . . ) for uniquely identifying each of the plurality of insertion phrases is transmitted as the insertion phrase information DB. According to the above-described structure, an advantage is obtained in that the amount of data to be transmitted from the information provision device 100 to the terminal device 200 is reduced (consequently, the time necessary for communication is reduced) compared with the structure in which the fixed phrase information DA expressive of the fixed phrase itself and the insertion phrase information DB expressive of the insertion phrase itself are transmitted to the terminal device 200.

In the first embodiment, the transmission of the insertion phrase information DB using the second frequency band B2 is executed in parallel with the transmission of the fixed phrase information DA using the first frequency band B1. According to the above-described structure, since the fixed phrase information DA and the insertion phrase information DB are transmitted in parallel with each other by using different frequency bands, an advantage is obtained in that the time necessary for the transmission of the fixed phrase information DA and the insertion phrase information DB is reduced, for example, compared with the structure in which the fixed phrase information DA and the insertion phrase information DB are transmitted in a time-sharing manner.

Second Embodiment

In the first embodiment, a plurality of pieces of insertion phrase information DB representative of insertion phrases to be inserted in different positions of a fixed phrase are transmitted by using different frequency bands, respectively. A second embodiment shows by example a structure in which a plurality of pieces of insertion phrase information DB are transmitted in a common frequency band. In the second embodiment, the functions and structures of the signal generation portion 150 and the presentation information generation portion 220 are different from those of the first embodiment. In each mode shown below by example, for elements the workings and functions of which are similar to those of the first embodiment, the reference numerals and signs referred to in the description of the first embodiment are also used and detailed descriptions thereof are omitted as appropriate.

Figure 14:
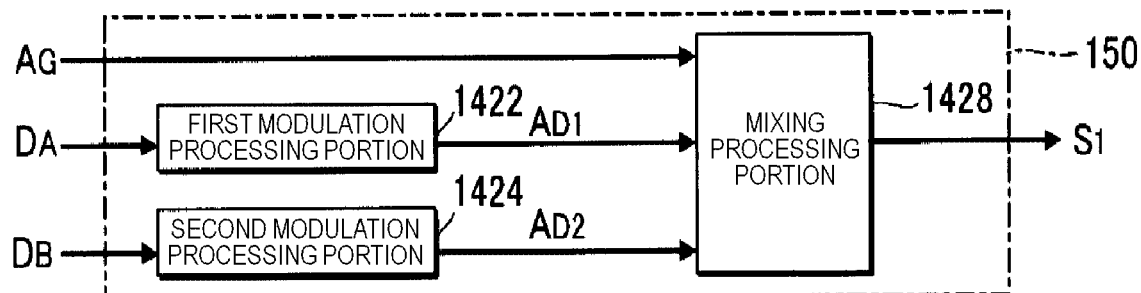
FIG. 14 is a block diagram showing the structure of the signal generation portion 150 of the second embodiment.

FIG. 14 is a block diagram showing the structure of the signal generation portion 150 of the second embodiment. As shown by example in FIG. 14, the signal generation portion 150 includes the first modulation processing portion 1422, the second modulation processing portion 1424 and the mixing processing portion 1428. The function and operation of the first modulation processing portion 1422 are similar to those of the first embodiment. The second modulation processing portion 1424 generates the second modulation signal AD2 containing the insertion phrase information DB read from the insertion phrase information table TB2-1 and the insertion phrase information DB read from the insertion phrase information table TB2-2 as audio components in different sections on a time base by a method similar to that of the first modulation processing portion 1422.

Figure 15:
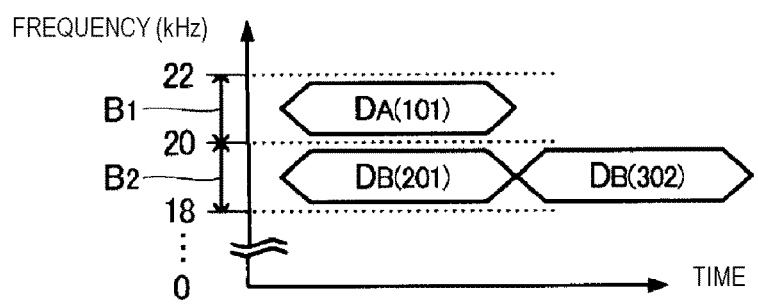
FIG. 15 is an explanatory view of the first frequency band B1 and the second frequency band B2.

The mixing processing portion 1428 mixes the guidance signal AG supplied from the control portion 140, the first modulation signal AD1 generated by the first modulation processing portion 1422 and the second modulation signal AD2 generated by the second modulation processing portion 1424, thereby generating the reproduction signal S1. The sound emission device 160 emits the sound corresponding to the reproduction signal S1 generated by the signal generation portion 150. The sound emission device 160 of the second embodiment transmits, as in the first embodiment, the fixed phrase information DA and the insertion phrase information DB to the terminal device 200 by audio communication using sounds which are air vibrations as the transmission medium. As is understood from FIG. 15, the transmission of the fixed phrase information DA using the first frequency band B1 and the transmission of the insertion phrase information DB using the second frequency band B2 are executed in parallel. Moreover, in the second embodiment, the insertion phrase information DB of each of a plurality of insertion phrases to be inserted in different positions of a fixed phrase is transmitted in a time-sharing manner by using the common second frequency band B2. Specifically, as shown by example in FIG. 15, the time-sharing transmission of a plurality of pieces of insertion phrase information DB using the second frequency band B2 is executed in parallel with the transmission of the fixed phrase information DA using the first frequency band B1.

Figure 16:
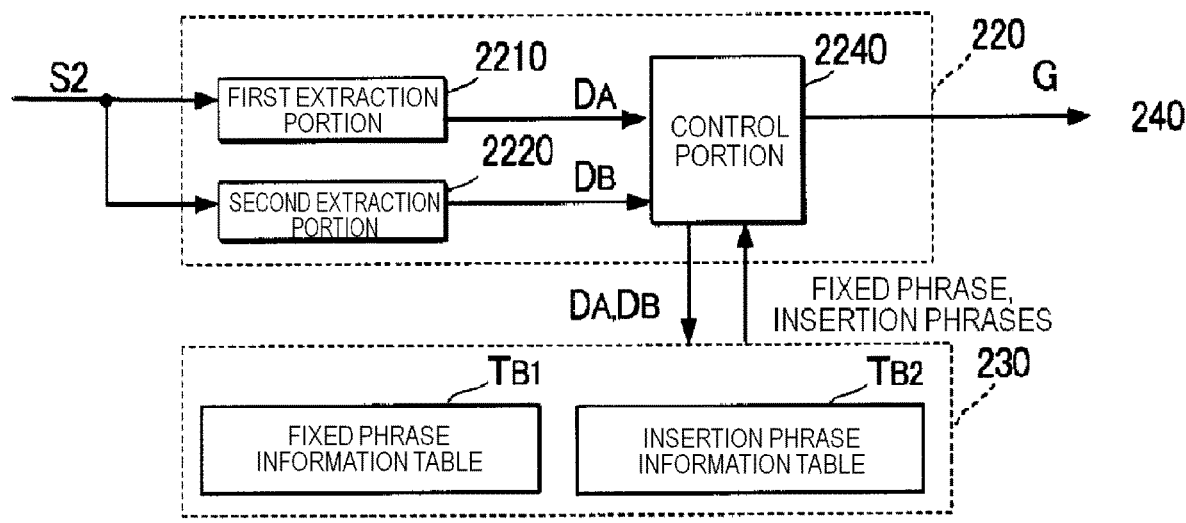
FIG. 16 is a block diagram showing the structure of the presentation information generation portion 220 of the second embodiment.

FIG. 16 is a block diagram showing the structure of the presentation information generation portion 220 of the second embodiment. In the presentation information generation portion 220 of the second embodiment, the third extraction portion 2230 is omitted from the presentation information generation portion 220 of the first embodiment. Since the functions and operations of the first extraction portion 2210 and the control portion 2240 are similar to those of the first embodiment, detailed descriptions thereof are omitted. The second extraction portion 2220 enhances, of the sound collection signal S2, the band component of the second frequency band B2 containing the insertion phrase information DB by a band-pass filter and causes it to pass through a matched filter the coefficient of which is the spread code used for the spread modulation of the insertion phrase information DB, thereby extracting a plurality of pieces of insertion phrase information DB. In the example of FIG. 4, the second extraction portion 2220 extracts the insertion phrase information DB [201] and the insertion phrase information DB [302] transmitted as the audio components of the second frequency band B2. The processing that follows is similar to that of the first embodiment.

Figure 8:
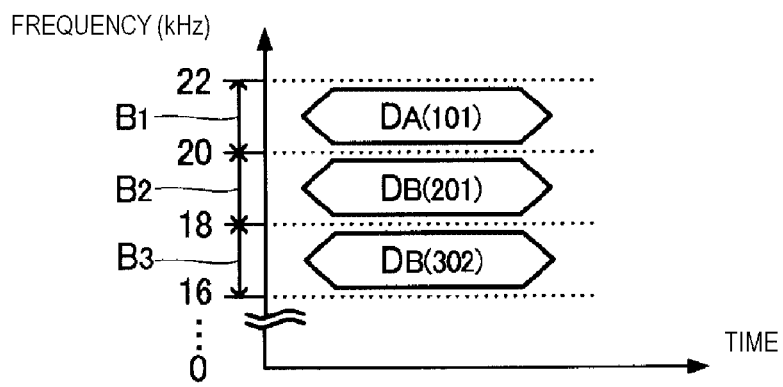
FIG. 8 is an explanatory view of a first frequency band B1 to a third frequency band B3.

The second embodiment also realizes effects similar to those of the first embodiment. Moreover, in the second embodiment, a plurality of pieces of insertion phrase information DB is transmitted in a time-sharing manner by using the second frequency band B2 in parallel with the transmission of the fixed phrase information DA using the first frequency band B1. According to the above-described structure, an advantage is obtained in that the number of frequency bands necessary for the transmission of the insertion phrase information DB is reduced (the third frequency band B3 shown by example in FIG. 8 is unnecessary) compared with the structure of the first embodiment in which a plurality of pieces of insertion phrase information DB are transmitted by using different frequency bands, respectively. On the contrary, according to the structure of the first embodiment, an advantage is obtained in that the time necessary for the transmission of the fixed phrase information DA and the insertion phrase information DB is reduced compared with the structure of the second embodiment.

Third Embodiment

Figure 17:
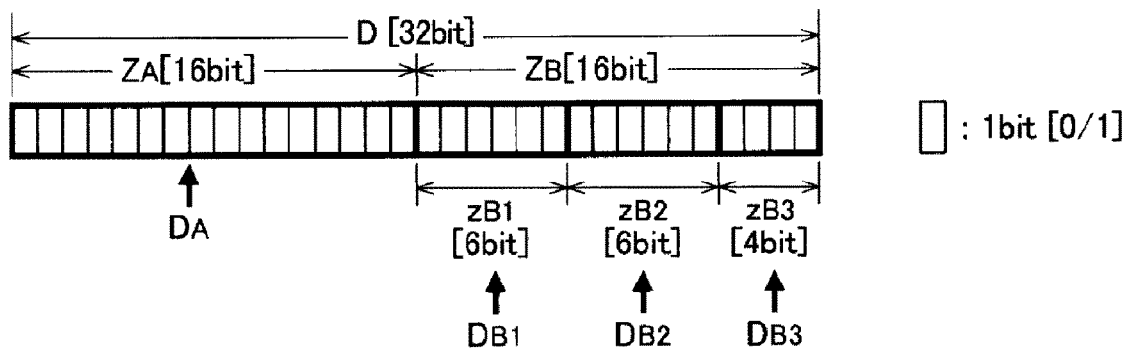
FIG. 17 is an explanatory view of distribution information D.

In a third embodiment, distribution information D containing the fixed phrase information DA and the insertion phrase information DB is transmitted from the information provision device 100 to the terminal device 200. FIG. 17 is an explanatory view of the distribution information D. As shown by example in FIG. 17, the distribution information D is expressed by a bit string of a predetermined length (for example, 32 bits). The distribution information D is divided into a first bit string ZA (for example, 16 bits) and a second bit string ZB (for example, 16 bits). The fixed phrase information DA is expressed by the first bit string ZA, and the insertion phrase information DB is expressed by the second bit string ZB. The number of bits may be different between the first bit string ZA and the second bit string ZB.

The second bit string ZB is divided into a plurality of unit bit strings zB (zB1, zB2, zB3) corresponding to different insertion sections TS of one fixed phrase specified by the fixed phrase information DA. The insertion phrase information DB of one insertion phrase to be inserted in the fixed phrase is expressed by one unit bit string zB. For example, the unit bit string zB1 is used for the insertion phrase information DB1 of the insertion phrase to be inserted in the first insertion section TS1 of the fixed phrase. Likewise, the unit bit string zB2 is used for the insertion phrase information DB2 of the insertion phrase to be inserted in the second insertion section TS2, and the unit bit string zB3 is used for the insertion phrase information DB3 of the insertion phrase to be inserted in a third insertion section TS3.

The number of bits may be different among a plurality of unit bit strings zB of the second bit string ZB. FIG. 17 shows by example a case where the unit bit string zB1 is six bits, the unit bit string zB2 is six bits and the unit bit string zB3 is four bits. However, whether the number of bits is the same or different among the unit bit strings zB (zB1, zB2, zB3) does not matter.

Figure 18:
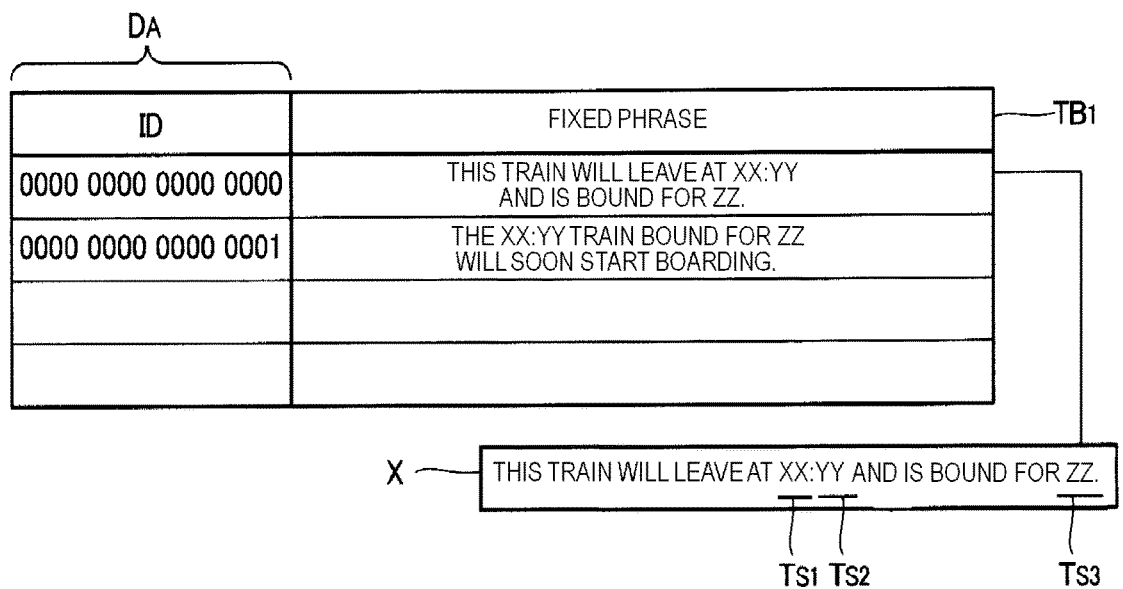
FIG. 18 is a view showing an example of the data structure of the fixed phrase information table TB1 of a third embodiment.

FIG. 18 is a view showing an example of the data structure of the fixed phrase information table TB1 of the third embodiment. As in the first embodiment, each fixed phrase of the fixed phrase information table TB1 includes one or more insertion sections TS. Focusing on a fixed phrase X "This train will leave at XX:YY and is bound for ZZ." of FIG. 18, the fixed phrase X includes a plurality of insertion sections TS (TS1, TS2, TS3).

In a plurality of insertion sections TS set in one fixed phrase, insertion phrases of different meanings are inserted. In the insertion section TS1 of the fixed phrase X of FIG. 18, a numeral representative of "hour" (for example, "0" to "23") is inserted as an insertion phrase. In the insertion section TS2, a numeral representative of "minute" (for example, "0" to "59") is inserted as an insertion phrase. In the insertion section TS3, a proper noun representative of a station name is inserted as an insertion phrase. To each of a plurality of fixed phrases, identification information (ID) expressed by the first bit string ZA of 16 bits is uniquely assigned as the fixed phrase information DA.

Figures 19, 20:
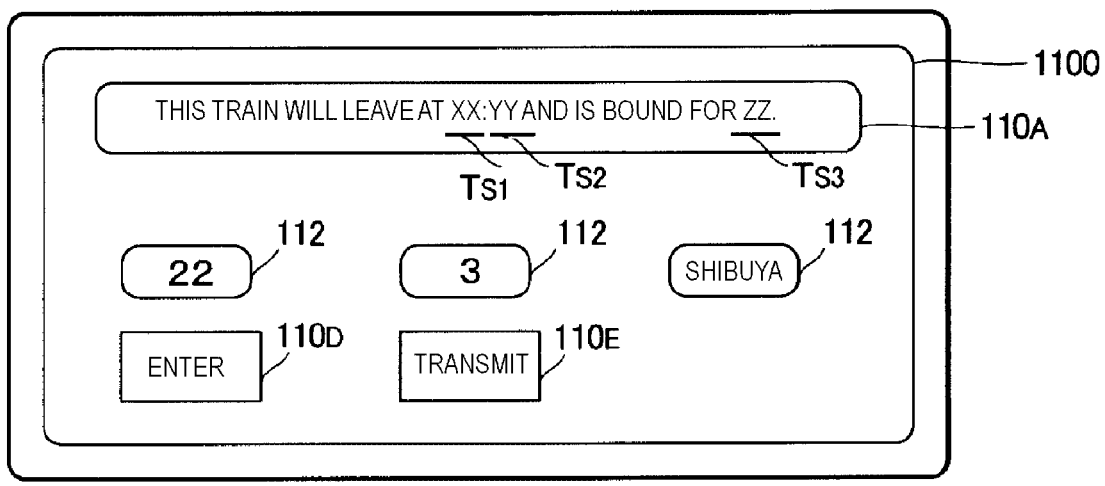
FIG. 19 is a view showing an example of the data structure of the insertion phrase information table TB2 of the third embodiment.
FIG. 20 is an explanatory view of selection of the guidance information.

FIG. 19 is a view showing an example of the data structure of the insertion phrase information table TB2 (TB2-1, TB2-2, TB2-3) of the third embodiment. The insertion phrase information table TB2-1 associates a plurality of insertion phrases to be inserted in the insertion section TS1 and the insertion phrase information DB1 (identification information) of each insertion phrase with each other. The plurality of insertion phrases registered in the insertion phrase information table TB2-1 are numerals "0" to "23" indicating "hour". The insertion phrase information DB1 of each insertion phrase is expressed by six bits secured as the unit bit string zB1 in the distribution information D.

The insertion phrase information table TB2-2 associates a plurality of insertion phrases to be inserted in the insertion section TS2 and the insertion phrase information DB2 (identification information) of each insertion phrase with each other. The plurality of insertion phrases registered in the insertion phrase information table TB2-2 are numerals "0" to "59" indicating "minute". The insertion phrase information DB2 of each insertion phrase is expressed by six bits secured as the unit bit string zB2 in the distribution information D.

The insertion phrase information table TB2-3 associates the plurality of insertion phrases of station names ("Shinjuku", "Yoyogi", etc.) to be inserted in the insertion section TS3 and the insertion phrase information DB3 of each insertion phrase with each other. The insertion phrase information DB3 of each insertion phrase is expressed by four bits secured as the unit bit string zB3 in the distribution information D.

FIG. 20 is a display example of the guidance information selection screen 1100 in the third embodiment. As in the first embodiment, the operator OP selects a fixed phrase by an operation on the fixed phrase selection field 110A of the guidance information selection screen 1100, and selects an insertion phrase to be inserted in the fixed phrase by an operation on each of a plurality of insertion phrase selection fields 112. FIG. 20 shows by example the guidance information selection screen 1100 when the operator OP selects the fixed phrase X "This train will leave at XX:YY and is bound for ZZ." and insertion phrases "22", "3" and "Shibuya".

The control portion 140 of the information provision device 100 reads from the fixed phrase information table TB1 the fixed phrase information DA [0000 0000 0000 0000] representative of the fixed phrase X "This train will leave at XX:YY and is bound for ZZ." selected by the operator OP. Likewise, the control portion 140 reads from the insertion phrase information table TB2 (TB2-1, TB2-2, TB2-3) the insertion phrase information DB1 [010110] representative of the insertion phrase "22", the insertion phrase information DB2 [000011] representative of the insertion phrase "3" and the insertion phrase information DB3 [0011] representative of the insertion phrase "Shibuya". The distribution information D where the fixed phrase information DA, the insertion phrase information DB1, the insertion phrase information DB2 and the insertion phrase information DB3 read by the control portion 140 are arranged is supplied to the signal generation portion 150.

Figure 21:
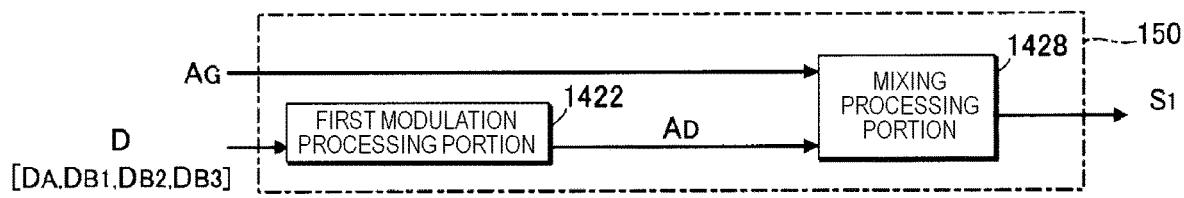
FIG. 21 is a block diagram showing the structure of the signal generation portion 150 of the third embodiment.

FIG. 21 is a block diagram showing the structure of the signal generation portion 150 of the third embodiment. As shown by example in FIG. 21, the signal generation portion 150 includes the first modulation processing portion 1422 and the mixing processing portion 1428. The first modulation processing portion 1422 generates the modulation signal AD containing the distribution information D as the audio component of the first frequency band B1 by a method similar to that of the first embodiment.

The mixing processing portion 1428 mixes the guidance signal AG supplied from the control portion 140 and the first modulation signal AD1 generated by the first modulation processing portion 1422, thereby generating the reproduction signal S1. The sound emission device 160 emits, as in the first embodiment, the sound corresponding to the reproduction signal S1 generated by the signal generation portion 150. As shown by example in FIG. 22, the fixed phrase information DA [0000 0000 0000 0000] expressed by the first bit string ZA, the insertion phrase information DB1 [010110] expressed by the unit bit string zB1, the insertion phrase information DB2 [000011] expressed by the unit bit string zB2 and the insertion phrase information DB3 [0011]

expressed by the unit bit string zB3 are transmitted to the terminal device 200 in a time-sharing manner by using the first frequency band B1.

Figure 23:
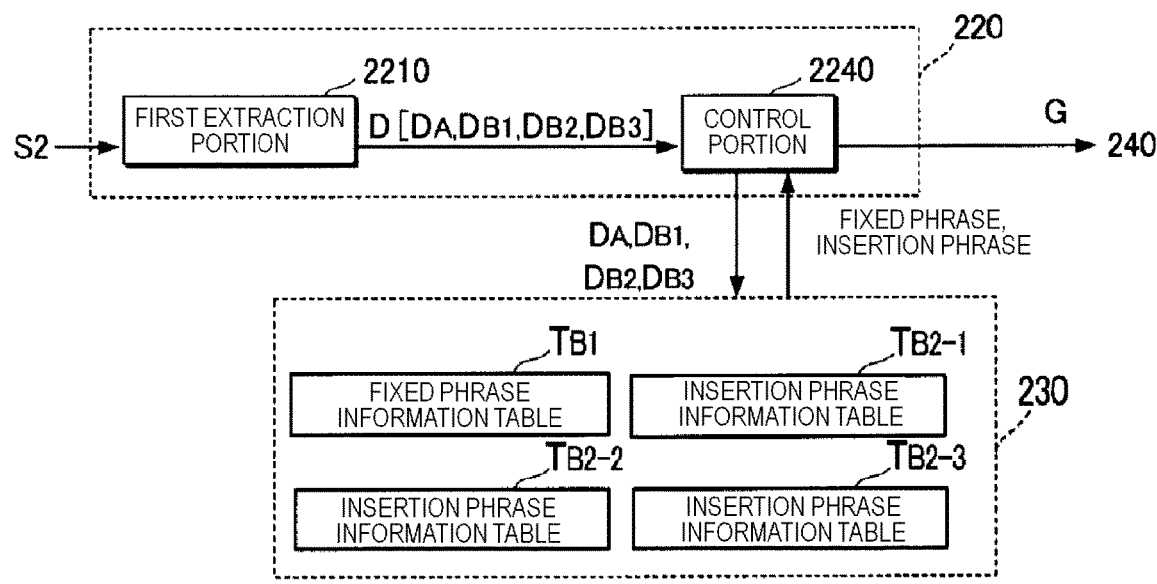
FIG. 23 is a block diagram showing the structure of the presentation information generation portion 220 of the third embodiment.

FIG. 23 is a block diagram showing the structure of the presentation information generation portion 220 of the terminal device 200 of the third embodiment. The fixed phrase information table TB1 and the insertion phrase information table TB2 (TB2-1, TB2-2, TB2-3) stored in the storage portion 230 of the terminal device 200 are similar to the fixed phrase information table TB1 and the insertion phrase information table TB2 stored in the storage portion 130 of the information provision device 100. As shown by example in FIG. 23, the presentation information generation portion 220 includes the first extraction portion 2210 and the control portion 2240. The first extraction portion 2210 extracts, as in the first embodiment, the distribution information D (DA, DB1, DB2, DB3) by the demodulation of the sound collection signal S2 generated by the sound collection device 210. The control portion 2240 reads from the fixed phrase information table TB1 the fixed phrase corresponding to the fixed phrase information DA extracted by the first extraction portion 2210 and supplies it to the presentation portion 240. Likewise, the control portion 2240 reads from the insertion phrase information table TB2 (TB2-1, TB2-2, TB2-3) the insertion phrases corresponding to the insertion phrase information DB (DB1, DB2, DB3) and supplies it to the presentation portion 240. The presentation portion 240 of the terminal device 200 presents, as in the first embodiment, the guidance information where the insertion phrases are inserted in the insertion sections TS of the fixed phrase.

The third embodiment also realizes effects similar to those of the first embodiment. Moreover, in the third embodiment, since the fixed phrase information DA and the pieces of insertion phrase information DB (DB1, DB2, DB3) are transmitted from the information provision device 100 to the terminal device 200 in a time-sharing manner, an advantage is obtained in that the frequency band necessary for the transmission of the fixed phrase information DA and the insertion phrase information DB is reduced compared with the first embodiment using a plurality of frequency bands (B1 to B3).

Modifications

The modes shown above by example may be modified variously. Concrete modes of modifications are shown below by example. Two or more modes arbitrarily selected from the following examples may appropriately be merged within the bounds where no contradiction arises therebetween.

(1) The above-described embodiments show by example a structure in which the identification information for uniquely identifying each of a plurality of fixed phrases is transmitted as the fixed phrase information DA and the identification information for uniquely identifying each of a plurality of insertion phrases is transmitted as the insertion phrase information DB. In addition to the above example, the fixed phrase information DA expressive of the fixed phrase itself and the insertion phrase information DB expressive of the insertion phrase itself may be transmitted to the terminal device 200. According to the structure in which the fixed phrase information DA expressive of the fixed phrase itself and the insertion phrase information DB expressive of the insertion phrase itself are transmitted, since it is unnecessary to hold a plurality of fixed phrases (for example, the fixed phrase information table TB1) and a plurality of insertion phrases (the insertion phrase information table TB2) at the terminal device 200, an advantage is obtained in that the amount of data to be held to create the presentation information G at the terminal device 200 (the capacity storage necessary for the storage portion 230) is reduced. Moreover, the fixed phrase information DA expressive of the identification information of the fixed phrase and the insertion phrase information DB expressive of the insertion phrase itself may be transmitted to the terminal device 200. When the insertion phrase is formed of a sufficiently short character string (a station name, a numeral, etc.) compared with the fixed phrase, the amount of information to be transmitted can be suppressed to an extent similar to that in the structure in which the identification information of the insertion phrase is transmitted to the terminal device 200. As is understood from the above description, the "fixed phrase information representative of the fixed phrase" contains both the information expressive of the fixed phrase itself and the information expressive of the identification information of the fixed phrase. Likewise, the "insertion phrase information representative of the insertion phrase" contains both the information expressive of the insertion phrase itself and the information expressive of the identification information of the insertion phrase.

(2) While in the above-described embodiments, the fixed phrase information DA and the insertion phrase information DB are transmitted to the terminal device 200 by audio communication using sounds as the transmission medium, the communication method for transmitting the fixed phrase information DA and the insertion phrase information DB is not limited to audio communication. For example, the fixed phrase information DA and the insertion phrase information DB may be transmitted from the information provision device 100 to the terminal device 200 by near field communication using electromagnetic waves such as radio waves or infrared rays as the transmission medium. As is understood from the above example, the audio communication using sounds as the transmission medium and the radio communication using electromagnetic waves as the transmission medium are examples of the near field communication.

In the above-described embodiments, the fixed phrase information DA and the insertion phrase information DB are transmitted from the information provision device 100 to the terminal device 200 by using the near field communication (radio communication with no communication network in between). In addition to the above example, to the terminal device 200 preregistered as the object of transmission, the fixed phrase information DA and the insertion phrase information DB may be transmitted (push distribution) from the information provision device 100 through a communication network such as a mobile communication network or the Internet.

(3) While the guidance information where an insertion phrase is inserted in a fixed phrase is shown as the presentation information G in the above-described embodiments, the contents of the presentation information G are not limited to the above example.

Figure 24:
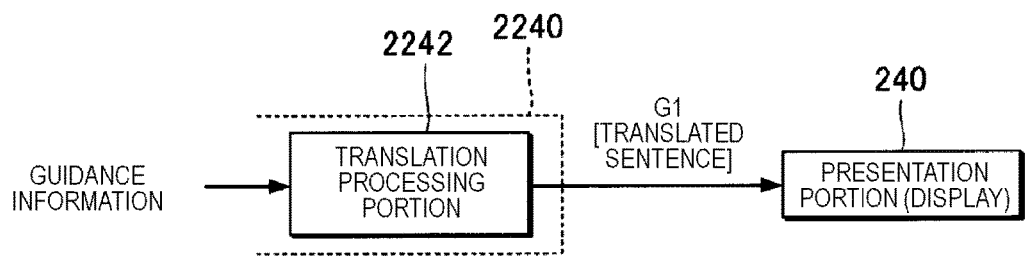
FIG. 24 is a block diagram showing the structure of a control portion 2240 of a modification.
Figure 25:
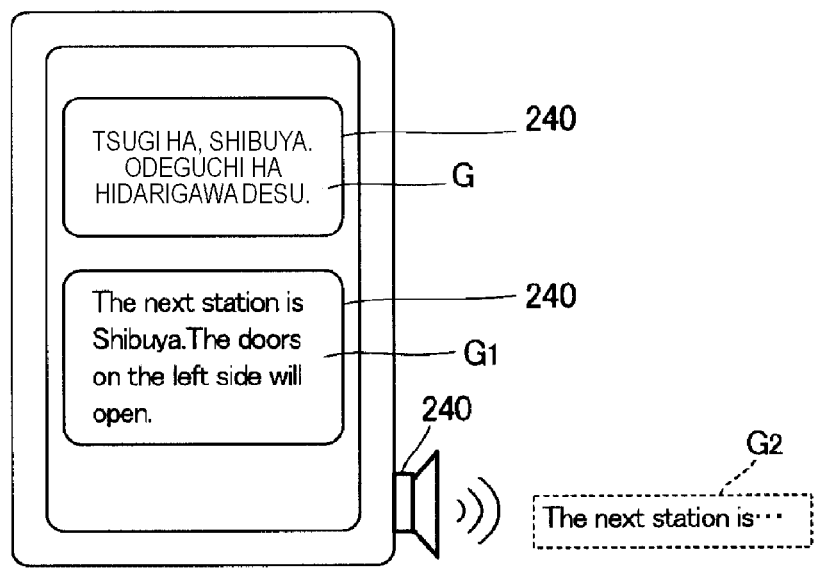
FIG. 25 is an explanatory view of the presentation information G created by the presentation information generation portion 220 of the modification.
Figure 26:
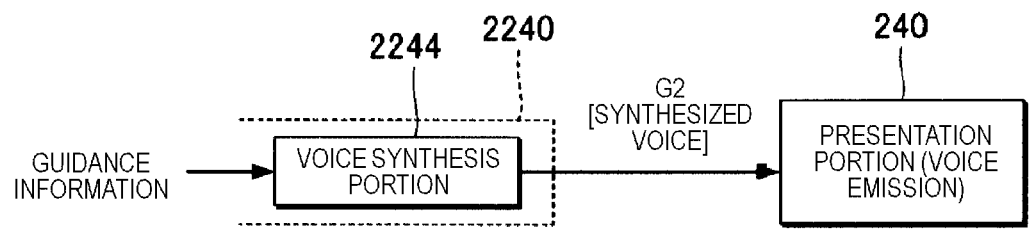
FIG. 26 is a block diagram showing the structure of the control portion 2240 of the modification.

For example, the control portion 2240 shown by example in FIG. 24 includes a translation processing portion 2242. The translation processing portion 2242 generates as presentation information G1 a translated sentence of guidance information where a fixed phrase and insertion phrases are combined, into another language (machine translation). As shown by example in FIG. 25, the presentation portion 240 displays as the presentation information G1 a character string of the guidance information translated by the translation processing portion 2242. Therefore, an advantage is obtained in that users for whom it is difficult to understand the language of the guidance voice (for example, foreigners) can grasp the contents of the guidance voice. On the contrary, the control portion 2240 shown by example in FIG. 26 includes a voice synthesis portion 2244. On the contrary, the control portion 2240 shown by example in FIG. 26 includes the voice synthesis portion 2244. The voice synthesis portion 2244 generates as presentation information G2 the guidance voice which is an utterance of guidance information where a fixed phrase and insertion phrases are combined, for example, by concatenative voice synthesis. As shown by example in FIG. 25, the presentation portion 240 emits as the presentation information G2 the guidance voice synthesized by the voice synthesis portion 2244. Therefore, an advantage is obtained in that users for whom it is difficult to hear the guidance voice (for example, hard-of-hearing persons) can grasp the contents of the guidance voice. According to the structure provided with both the translation processing portion 2242 of FIG. 24 and the voice synthesis portion 2244 of FIG. 26, it is possible for the presentation portion 240 to emit a guidance voice which is an utterance of a translated sentence of the guidance information. As is understood from the above description, the "presentation" includes both a mode of visually presenting the presentation information G (or the presentation information G1) to the user and a mode of aurally presenting to the user by emitting the sound of a sound signal corresponding to the presentation information G2.

(4) While the presentation information G where a plurality of insertion phrases are inserted in a fixed phrase is shown as an example in the above-described embodiments, a structure in which presentation information G where one insertion phrase is inserted in one fixed phrase may be adopted. For example, in a fixed phrase "This train has stopped at a stop signal, and will start as soon as the train at XX station leaves.", shown by example in the fixed phrase information DA [104], of the fixed phrase information table TB1 of FIG. 5, one insertion phrase is inserted. For example, in addition to the fixed phrase information DA corresponding to the fixed phrase, the insertion phrase information DB corresponding to the insertion phrase and the guidance signal AG, information representing that the number of insertion phrases is one (for example, a null code) may be supplied from the control portion 140 to the signal generation portion 150 to generate the reproduction signal S1 containing the information.

Figure 27:
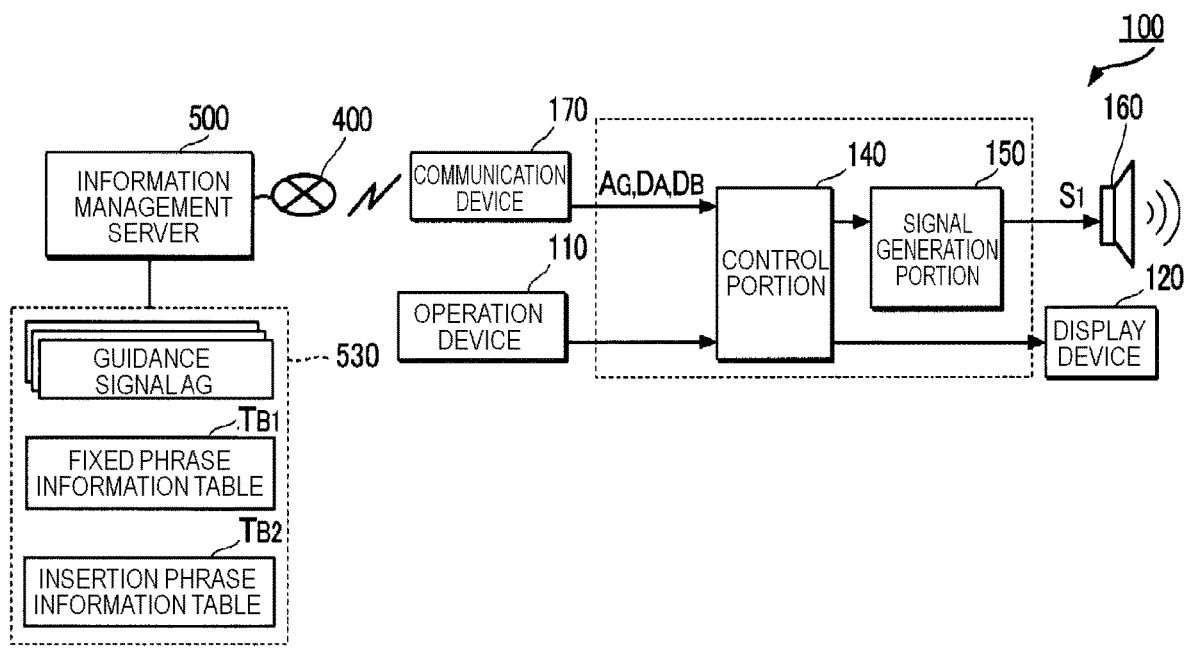
FIG. 27 is a configuration diagram of the information provision system 1 according to a modification.

(5) While the fixed phrase information table TB1 and the insertion phrase information table TB2 are stored in the storage portion 130 of the information provision device 100 in the above-described embodiments, the fixed phrase information table TB1 and the insertion phrase information table TB2 (further, the guidance signal AG) may be stored in a storage portion external to the information provision device 100. That is, the storage portion 130 is not an essential element of the information provision device 100. For example, FIG. 27 shows by example a structure in which the fixed phrase information table TB1 and the insertion phrase information table TB2 are stored in a storage portion 530 of an information management server 500 separate from the information provision device 100. The information provision device 100 is provided with a communication device 170 capable of communicating with the information management server 500 through a communication network (a mobile communication network or the Internet) 400. The control portion 140 receives the fixed phrase information DA, the insertion phrase information DB and the guidance signal AG in the storage portion 530 by a communication between the communication device 170 and the information management server 500.

Moreover, while the fixed phrase information table TB1 and the insertion phrase information table TB2 are stored in the storage portion 230 of the terminal device 200 in the above-described embodiments, as in the example shown in FIG. 27, the fixed phrase information table TB1 and the insertion phrase information table TB2 stored in a storage portion external to the terminal device 200 (so-called a cloud storage) may be used by the terminal device 200. That is, the storage portion 230 shown by example in the above-described embodiments is not an element essential to the terminal device 200. Moreover, the external storage portion 530 (the information management server 500) storing the fixed phrase information table TB1 and the insertion phrase information table TB2 may be shared by the information provision device 100 and the terminal device 200.

(6) While "hour", "minute" and "station names" are shown as examples of insertion phrases having different meanings in the third embodiment, in addition to these examples, line names, airline company names, boarding gates (numbers), platforms for getting on and off (numbers) and the like may be shown as examples of insertion phrases. Moreover, a structure in which a plurality of insertion phrases of the same kind are inserted in different insertion section TS of one fixed phrase (for example, a structure in which the "station name" of the departure station and the "station name" of the arrival station are inserted) may be adopted. While a structure in which three insertion sections TS (TS1, TS2, TS3) are set in one fixed phrase is shown by example in the third embodiment, the number of insertion sections is not limited to the above example.

Figure 22:
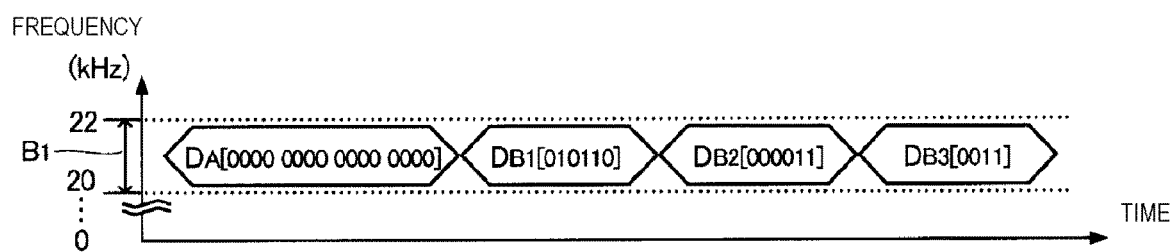
FIG. 22 is an explanatory view regarding the transmission of the distribution information D.

(7) While in the third embodiment, a series of bit string (32 bits) containing the fixed phrase information DA and a plurality of pieces of insertion phrase information DB (DB1, DB2, DB3) is transmitted from the information provision device 100 to the terminal device 200 as the distribution information D as shown by example in FIG. 22, the fixed phrase information DA and the insertion phrase information DB may be transmitted in a time-sharing manner as separate bit strings in one first frequency band B1. That is, the fixed phrase information DA and the insertion phrase information DB are successively transmitted at an interval therebetween.

Some aspects of the present invention are explained as follows.

An information provision device according to a first aspect of the present invention includes transmission means for transmitting, by near field communication, fixed phrase information, of guidance information that guides a user, representative of a fixed phrase and insertion phrase information, of the guidance information, selected from among a plurality of pieces of insertion phrase information representative of different insertion phrases to be inserted in the fixed phrase, to a terminal device capable of presenting, to the user, presentation information corresponding to the guidance information where the insertion phrase represented by the insertion phrase information is inserted in the fixed phrase represented by the fixed phrase information along with emission of a guidance voice which is an utterance of the guidance information.

According to the above-described configuration, the fixed phrase information, of the guidance information, representative of a fixed phrase and the insertion phrase information selected from among a plurality of pieces of insertion phrase information representative of different insertion phrases to be inserted in the fixed phrase are transmitted to the terminal device by near field communication, and the presentation information corresponding to the guidance information is created by inserting the insertion phrase into the fixed phrase and is presented to the user of the terminal device. That is, one fixed phrase is shared for the provision of a plurality of pieces of guidance information containing different insertion phrases. Therefore, the amount of data necessary for providing the terminal device with a variety of guidance information (consequently, for example, the storage capacity necessary for guidance) can be reduced compared with the configuration where a plurality of pieces of guidance information where words corresponding to insertion phrases are different are prepared and selectively provided to the user.

In an example of the information provision device according to the first aspect, the transmission means transmits, to the terminal device, fixed phrase information representative of one fixed phrase selected from among a plurality of different fixed phrases and insertion phrase information, selected from among a plurality of pieces of insertion phrase information corresponding to the one fixed phrase, of a plurality of pieces of insertion phrase information corresponding to the plurality of fixed phrases, respectively.

In the above-described aspect, for each of a plurality of different pieces of guidance information, a fixed phrase of the guidance information and a plurality of insertion phrases that can be inserted in the fixed phrase are prepared, and the fixed phrase information of one piece of guidance information selected from among the plurality of pieces of guidance information and the insertion phrase information selected from among a plurality of pieces of insertion phrase information corresponding to the one piece of guidance information are transmitted to the terminal device. Therefore, a plurality of kinds of guidance information where not only the insertion phrases but also the fixed phrases are different can be provided to the terminal device.

In an example of the information provision device according to the first aspect, signal generation means is provided for generating a sound signal by mixing a guidance signal representative of the guidance voice and a modulation signal containing the fixed phrase information and the insertion phrase information as audio components, and the transmission means is sound emission means for transmitting the fixed phrase information and the insertion phrase information to the terminal device by audio communication by emitting a sound containing the guidance voice in response to the sound signal generated by the signal generation means.

According to the above-described configuration, in response to the sound signal where the guidance signal representative of the guidance voice of the guidance information and a modulation signal containing the fixed phrase information and the insertion phrase information as audio components are mixed, the emission of the sound containing the guidance voice and the transmission of the fixed phrase information and the insertion phrase information by audio communication using sounds as the transmission medium are executed by the sound emission means. Therefore, the guidance information can be presented from the terminal device to the user along with the emission of the guidance voice which is an utterance of the guidance information. Moreover, since the sound emission means for emitting the guidance voice is used for the transmission of both the fixed phrase information and the insertion phrase information, an advantage is obtained in that a communication device exclusively used for the transmission of the fixed phrase information and the insertion phrase information is unnecessary.

In an example of the information provision device according to the first aspect, the transmission means transmits, as the fixed phrase information, first identification information for identifying the fixed phrase, and transmits, as the insertion phrase information, second identification information for identifying the insertion phrase.

According to the above-described configuration, the first identification information for identifying the fixed phrase is transmitted as the fixed phrase information and the second identification information for identifying the insertion phrase is transmitted as the insertion phrase information. Therefore, an advantage is obtained in that the amount of data to be transmitted from the information provision device to the terminal device is reduced (consequently, the time necessary for communication is reduced) compared with the configuration in which the fixed phrase information expressive of the fixed phrase itself and the insertion phrase information expressive of the insertion phrase itself are transmitted to the terminal device.

In an example of the information provision device according to the first aspect, the transmission means transmits, to the terminal device, the fixed phrase information representative of the fixed phrase and a plurality of pieces of insertion phrase information representative of the insertion phrases to be inserted in different positions of the fixed phrase.

According to the above-described configuration, since the fixed phrase information and a plurality of pieces of insertion phrase information are transmitted to the terminal device, an advantage is obtained in that a variety of guidance information where a plurality of insertion phrases are inserted in different positions of one fixed phrase can be provided to the user.

In an example of the information provision device according to the first aspect, the transmission means parallelly executes transmission of the fixed phrase information using a first frequency band and transmission of the insertion phrase using a second frequency band different from the first frequency band.

According to the above-described configuration, since the fixed phrase information and the insertion phrase information are transmitted in parallel with each other by using different frequency bands, an advantage is obtained in that the time necessary for the transmission of the fixed phrase information and the insertion phrase information is reduced, for example, compared with the configuration in which the fixed phrase information and the insertion phrase information are transmitted in a time-sharing manner.

In an example of the information provision device according to the first aspect, in parallel with the transmission of the fixed phrase information using the first frequency band, the transmission means transmits the plurality of pieces of insertion phrase information by using the second frequency band different from the first frequency band in a time-sharing manner.

According to the above-described configuration, since a plurality of pieces of insertion phrase information are transmitted in a time-sharing manner by a communication using the second frequency band, an advantage is obtained in that the number of frequency bands necessary for the transmission of the insertion phrase information is reduced compared with the configuration in which a plurality of pieces of insertion phrase information are transmitted by using different frequency bands, respectively.

In an example of the information provision device according to the first aspect, the transmission means transmits the fixed phrase information and the insertion phrase information in a time-sharing manner by using a single frequency band.

According to the above-described configuration, since the fixed phrase information and the insertion phrase information are transmitted in a time-sharing manner by using a single frequency band, an advantage is obtained in that the number of frequency bands necessary for the transmission of the fixed phrase information and the insertion phrase information is reduced.

To solve the above-mentioned problem, a terminal device according to a second aspect of the present invention is provided with: reception means for receiving fixed phrase information, of guidance information that guides a user, representative of a fixed phrase and insertion phrase information, of the guidance information, selected from among a plurality of pieces of insertion phrase information representative of different insertion phrases to be inserted in the fixed phrase, from an information provision device that transmits the fixed phrase information and the insertion phrase information by near field communication; information generation means for generating presentation information corresponding to the guidance information where the insertion phrase represented by the insertion phrase information received by the reception means is inserted in the fixed phrase represented by the fixed phrase information received by the reception means; and presentation means for presenting, to the user, the presentation information generated by the information generation means along with emission of a guidance voice which is an utterance of the guidance information.

According to the above-described configuration, the fixed phrase information, of the guidance information, representative of a fixed phrase and the insertion phrase information selected from among a plurality of pieces of insertion phrase information representative of different insertion phrases to be inserted in the fixed phrase are transmitted to the terminal device by near field communication, and the presentation information corresponding to the guidance information is created by inserting the insertion phrase into the fixed phrase and is presented to the user of the terminal device. That is, one fixed phrase is shared for the provision of a plurality of pieces of guidance information containing different insertion phrases. Therefore, the amount of data necessary for providing the terminal device with a variety of guidance information (consequently, for example, the storage capacity necessary for guidance) can be reduced compared with the configuration where a plurality of pieces of guidance information where words corresponding to insertion phrases are different are prepared and selectively provided to the user.

In an example of the terminal device according to the second aspect, the information generation means includes a translation processing portion that translates the guidance information into another language, and the presentation means presents, to the user, a character string of the guidance information translated by the translation processing portion.

In an example of the terminal device according to the second aspect, the information generation means includes a voice synthesis portion that synthesizes the guidance voice which is the utterance of the guidance information, and the presentation means presents, to the user, the guidance voice synthesized by the voice synthesis portion.

The information provision device according to the above-described aspects is not only implemented by a dedicated electronic circuit but also implemented by a cooperation between a general-purpose arithmetic processing unit such as a CPU (central processing unit) and a program. The program of the present invention may be provided in an aspect of being stored in a computer-readable recording medium and installed on a computer. While the recording medium is, for example, a non-transitory recording medium and a good example is an optical recording medium (optical disk) such as a CD-ROM, recording media of given known formats such as a semiconductor recording medium and a magnetic recording medium may be embraced. For example, the program of the present invention may be provided in an aspect of distribution through a communication network and being installed on a computer. Moreover, the present invention is also identified as an operation method (information provision method) of the information provision device according to the above-described aspects.

Moreover, an information provision system according to another aspect of the present invention includes an information provision device and a terminal device, the information provision device includes transmission means for transmitting, by near field communication, fixed phrase information, of guidance information that guides a user, representative of a fixed phrase and insertion phrase information, of the guidance information, selected from among a plurality of pieces of insertion phrase information representative of different insertion phrases to be inserted in the fixed phrase, to the terminal device capable of presenting, to the user, presentation information corresponding to the guidance information where the insertion phrase represented by the insertion phrase information is inserted in the fixed phrase represented by the fixed phrase information along with emission of a guidance voice which is an utterance of the guidance information, and the terminal device is provided with: reception means for receiving the fixed phrase information and the insertion phrase information from the transmission means of the information provision device; information generation means for generating presentation information corresponding to the guidance information where the insertion phrase represented by the insertion phrase information received by the reception means is inserted in the fixed phrase represented by the fixed phrase information received by the reception means; and presentation means for presenting, to the user, the presentation information generated by the information generation means along with emission of a guidance voice which is an utterance of the guidance information.

Moreover, an information provision method according to another aspect of the present invention includes transmitting, by near field communication, fixed phrase information, of guidance information that guides a user, representative of a fixed phrase and insertion phrase information, of the guidance information, selected from among a plurality of pieces of insertion phrase information representative of different insertion phrases to be inserted in the fixed phrase, to a terminal device capable of presenting, to the user, presentation information corresponding to the guidance information where the insertion phrase represented by the insertion phrase information is inserted in the fixed phrase represented by the fixed phrase information along with emission of a guidance voice which is an utterance of the guidance information.

Further, the above information provision method may further include receiving the fixed phrase information and the insertion phrase information; generating presentation information corresponding to the guidance information where the insertion phrase represented by the received insertion phrase information is inserted in the fixed phrase represented by the received fixed phrase information; and presenting, to the user, the generated presentation information along with emission of a guidance voice which is an utterance of the guidance information.

Reference signs and numerals corresponding to the elements of the embodiments are listed below, for reference only.
100: Information provision device;
110: operation device;
110A: fixed phrase selection field;
110B: insertion phrase selection field;
110C: insertion phrase selection field;
110D: enter button;
110E: transmission button;
112: insertion phrase selection field;
120: display device;
130: storage portion;
140: control portion;
150: signal generation portion;
160: sound emission device;
170: communication device;
1100: guidance information selection screen;
1422: first modulation processing portion;
1424: second modulation processing portion;
1426: third modulation processing portion;
1428: mixing processing portion;
200: terminal device;
210: sound collection device;
220: presentation information generation portion;
230: storage portion;
240: presentation portion;
2210: first extraction portion;
2220: second extraction portion;
2230: third extraction portion;
2240: control portion;
2242: translation processing portion;
2244: voice synthesis portion;
400: communication network;
500: information management server;
G: presentation information;
TB1: fixed phrase information table; and
TB2: insertion phrase information table.

What is claimed is:

1. An information provision device for providing information to a terminal device via audio communication, the information provision device comprising:
a memory storing instructions; and
a processor that implements the instructions to:
generate a sound signal representing guidance information for guiding a user, the sound signal including:
a guidance signal representing a guidance voice, which is an utterance of the guidance information; and
a modulation signal modulatable in frequency bands higher than an audible frequency band, and including:
fixed phrase information representing a fixed phrase in the guidance information; and
insertion phrase information, representing at least one insertion phrase to be inserted in the fixed phrase, selected from among a plurality of pieces of insertion phrase information representing different insertion phrases; and
transmit, to the terminal device, the fixed phrase information and the insertion phrase information via the audio communication, by emitting sound including the guidance voice in response to the generated sound signal.

2. The information provision device according to claim 1, wherein:
the fixed phrase information includes first identification information for identifying the fixed phrase, and
the insertion phrase information includes second identification information for identifying the at least one insertion phrase.

3. The information provision device according to claim 1, wherein the processor, in the transmission, transmits concurrently the fixed phrase information using a first frequency band and the insertion phrase information using a second frequency band different from the first frequency band.

4. The information provision device according to claim 1, wherein the processor, in the transmission, transmits the fixed phrase information and the insertion phrase information in a time-sharing manner using a single frequency band.

5. A terminal device comprising:
a memory storing instructions; and
processor that implements the instructions to:
receive, from an information provision device via audio communication, a sound collection signal representing guidance information for guiding a user, the guidance information including:
fixed phrase information representing a fixed phrase; and
insertion phrase information, representing at least one insertion phrase to be inserted in the fixed phrase, selected from among a plurality of pieces of insertion phrase information representative of different insertion phrases;
generate presentation information corresponding to the guidance information, where the at least one insertion phrase represented by the received insertion phrase information is inserted in the fixed phrase represented by the received fixed phrase information, wherein processor, in generating the presentation information:
enhances a first band component of a first frequency band of the sound collection signal including the fixed phrase information with a first bandpass filter, the first frequency band being higher than an audible frequency band;
causes the first band component to pass through a first matched filter with a coefficient thereof being a first spread code used for spread modulating the fixed phrase information;
enhances a second band component of a second frequency band of the sound collection signal including the insertion phrase information with a second bandpass filter, the second frequency band being higher than the audible frequency band; and
causes the second band component to pass through a second matched filter with a coefficient thereof being a second spread code used for spread modulating the insertion phrase information; and
present, to the user, the generated presentation information along with emission of a guidance voice, which is an utterance of the guidance information.

6. The terminal device according to claim 5, wherein:
the processor implements the instructions to translate the guidance information into another language, and
the processor, in presenting to the user, presents a character string of the translated guidance information.

7. The terminal device according to claim 5, wherein:
the processor implements the instructions to synthesize a guidance voice corresponding to the utterance of the guidance information, and the processor, in presenting to the user, presents the synthesized guidance voice.

8. An information provision system comprising:
a terminal device; and
an information provision device comprising:
   a first memory storing first instructions; and
   a first processor that implements the first instructions to:
     generate a sound signal representing guidance information for guiding a user, the sound signal including:
       a guidance signal representing a guidance voice, which is an utterance of the guidance information; and
       a modulation signal modulatable in frequency bands higher than an audible frequency band, and including:
         fixed phrase information representing a fixed phrase in the guidance information; and
         insertion phrase information, representing at least one insertion phrase to be inserted in the fixed phrase, selected from among a plurality of pieces of insertion phrase information representing different insertion phrases; and
     transmit, to the terminal device, the fixed phrase information and the insertion phrase information via the audio communication, by emitting sound including the guidance voice in response to the generated sound signal, and
wherein the terminal device comprises:
   a second memory storing second instructions; and
   a second processor that implements the second instructions to:
     receive, from the information provision device via the audio communication, a sound collection signal representing the guidance information, which includes the fixed phrase information and the insertion phrase information;
     generate presentation information corresponding to the guidance information, where the at least one insertion phrase represented by the received insertion phrase information is inserted in the fixed phrase represented by the received fixed phrase information, wherein the second processor, in generating the presentation information:
       enhances a first band component of a first frequency band of the sound collection signal including the fixed phrase information with a first bandpass filter, the first frequency band being higher than an audible frequency band;
       causes the first band component to pass through a first matched filter with a coefficient thereof being a first spread code used for spread modulating the fixed phrase information;
       enhances a second band component of a second frequency band of the sound collection signal including the insertion phrase information with a second bandpass filter, the second frequency band being higher than the audible frequency band; and
       causes the second band component to pass through a second matched filter with a coefficient thereof being a second spread code used for spread modulating the insertion phrase information; and
     present, to the user, the generated presentation information along with emission of the guidance voice corresponding to an utterance of the guidance information.

9. An information provision method comprising:
generating a sound signal representing guidance information for guiding a user, the sound signal including:
   a guidance signal representing a guidance voice, which is an utterance of the guidance information; and
   a modulation signal modulatable in frequency bands higher than an audible frequency band, and including:
     fixed phrase information representing a fixed phrase in the guidance information; and
     insertion phrase information, representing at least one insertion phrase to be inserted in the fixed phrase, selected from among a plurality of pieces of insertion phrase information representing different insertion phrases; and
transmitting, to a terminal device, the fixed phrase information and the insertion phrase information via audio communication, by emitting sound including the guidance voice in response to the sound signal being generated.

10. The information provision method according to claim 9, further comprising:
receiving a sound collection signal representing the guidance information, which includes the fixed phrase information and the insertion phrase information via the audio communication;
generating presentation information corresponding to the guidance information, where the at least insertion phrase represented by the received insertion phrase information is inserted in the fixed phrase represented by the received fixed phrase information, by:
   enhancing a first band component of a first frequency band of the sound collection signal including the fixed phrase information with a first bandpass filter, the first frequency band being higher than an audible frequency band;
   causing the first band component to pass through a first matched filter with a coefficient thereof being a first spread code used for spread modulating the fixed phrase information;
   enhancing a second band component of a second frequency band of the sound collection signal including the insertion phrase information with a second bandpass filter, the second frequency band being higher than the audible frequency band; and
   causing the second band component to pass through a second matched filter with a coefficient thereof being a second spread code used for spread modulating the insertion phrase information; and
presenting, to the user, the generated presentation information along with emission of the guidance voice corresponding to an utterance of the guidance information.

* * * * *